United States Patent
Yamada

(10) Patent No.: US 11,860,138 B2
(45) Date of Patent: Jan. 2, 2024

(54) ANALYSIS METHOD AND ANALYTICAL DEVICE

(71) Applicant: SHIMADZU CORPORATION, Kyoto (JP)

(72) Inventor: Masaki Yamada, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 609 days.

(21) Appl. No.: 16/972,174

(22) PCT Filed: Mar. 8, 2019

(86) PCT No.: PCT/JP2019/009393
§ 371 (c)(1),
(2) Date: Apr. 19, 2021

(87) PCT Pub. No.: WO2019/235011
PCT Pub. Date: Dec. 12, 2019

(65) Prior Publication Data
US 2021/0262993 A1    Aug. 26, 2021

(30) Foreign Application Priority Data

Jun. 6, 2018   (JP) .................................. 2018-109023

(51) Int. Cl.
    *G01N 30/72*      (2006.01)
    *G01N 27/62*      (2021.01)
    *G01N 30/86*      (2006.01)
(52) U.S. Cl.
    CPC ......... *G01N 30/7233* (2013.01); *G01N 27/62* (2013.01); *G01N 30/8675* (2013.01)

(58) Field of Classification Search
    CPC ..... H01J 49/0431; H01J 49/0404; G01N 1/00; G01N 1/20; G01N 30/7233; G01N 30/8675; G01N 27/62
    See application file for complete search history.

(56) References Cited

U.S. PATENT DOCUMENTS

2011/0198495 A1    8/2011   Hiraoka
2016/0349277 A1*  12/2016   Stubiger .............. G01N 33/587

FOREIGN PATENT DOCUMENTS

WO     2010/047399 A1    4/2010
WO     2011/063470 A1    6/2011
(Continued)

OTHER PUBLICATIONS

Kamlage, Beate, "Quality Markers Addressing Preanalytical Variations of Blood and Plasma Processing Identified by Broad and Targeted Metabolite Profiling", 2014, Clinical Chemistry, vol. 60, Issue 2, pp. 399-412 (Year: 2014).*

(Continued)

*Primary Examiner* — David E Smith
*Assistant Examiner* — Hsien C Tsai
(74) *Attorney, Agent, or Firm* — Sughrue Mion, PLLC

(57) ABSTRACT

An analysis method includes: subjecting a sample to liquid chromatography; performing first mass spectrometry of the sample subjected to the liquid chromatography to detect a first ion corresponding to cholesteryl ester and a second ion corresponding to cholesteryl ester peroxide; and analyzing a degree of oxidation of the sample based on a ratio between an intensity of the detected first ion and an intensity of the detected second ion.

15 Claims, 19 Drawing Sheets

(56) References Cited

FOREIGN PATENT DOCUMENTS

| WO | 2017/029401 A1 | 2/2017 |
|---|---|---|
| WO | 2017/029401 A8 | 2/2017 |

OTHER PUBLICATIONS

Communication dated Nov. 2, 2021 from the Japanese Patent Office in Application No. 2020-523520.

Extended European Search Report dated Feb. 22, 2022 from the European Patent Office in EP Application No. 19814017.0.

Laura A. Heiskanen et al., "Long-Term Performance and Stability of Molecular Shotgun Lipidomic Analysis of Human Plasma Samples", Analytical Chemistry, 2013, pp. 8757-8763, vol. 85, Issue 18.

Beate Kamlage et al., "Quality Markers Addressing Preanalytical Variations of Blood and Plasma Processing Identified by Broad and Targeted Metabolite Profiling" Clinical Chemistry, 2014, pp. 399-412, vol. 60, Issue 2.

Shu-Ping Hui et al., "Detection and characterization of cholesteryl ester hydroperoxides in oxidized LDL and oxidized HDL by use of an Orbitrap mass spectrometer", Analytical and Bioanalytical Chemistry vol. 404, 2012, pp. 101-112.

Simon H. J. Brown et al., "A Lipidomic Analysis of Placenta in Preeclampsia: Evidence for Lipid Storage", PLOS ONE, 2016, 13 pages, 11(9): E0163972.

Felipe Gazos-Lopez et al., "Host triacylglycerols shape the lipidome of intracellular trypanosomes and modulate their growth", PLOS Pathog, 2017, 22 p. 13(12):e1006800.

Hui Shu-Ping, "Analyses of Lipid Hydroperoxides and Physiologically Active Lipids by Mass Spectrometry", The Official Journal of Japanese Society of Laboratory Medicine, 2014, pp. 283-290, vol. 62, No. 3.

International Search Report of PCT/JP2019/009393 dated May 28, 2019 [PCT/ISA/210].

Written Opinion of PCT/JP2019/009393 dated May 28, 2019 [PCT/ISA/237].

* cited by examiner

FIG. 7 (A)  MARCH 2017
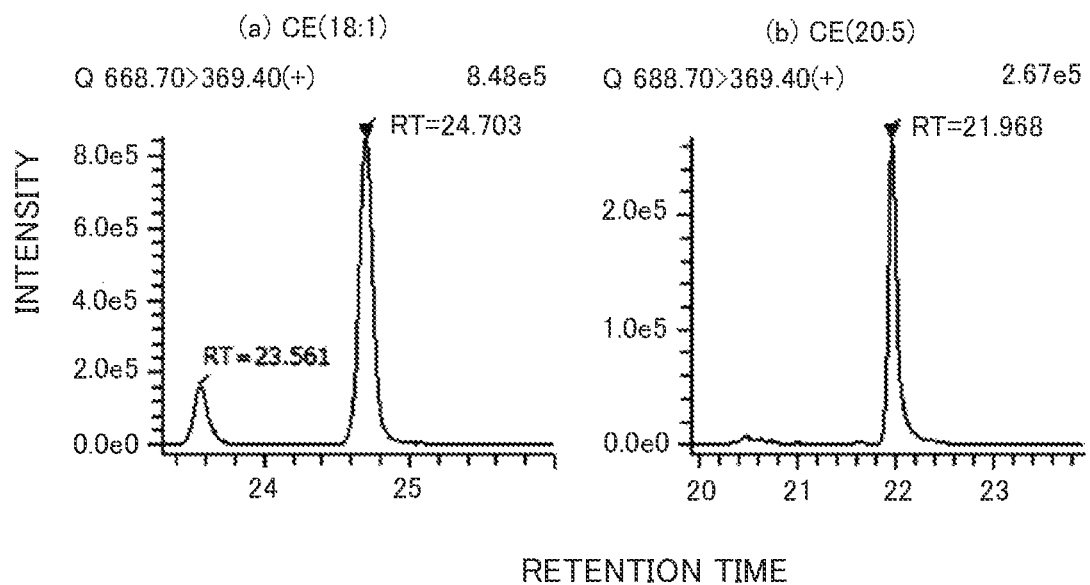
FIG. 7 (B)  MARCH 2018
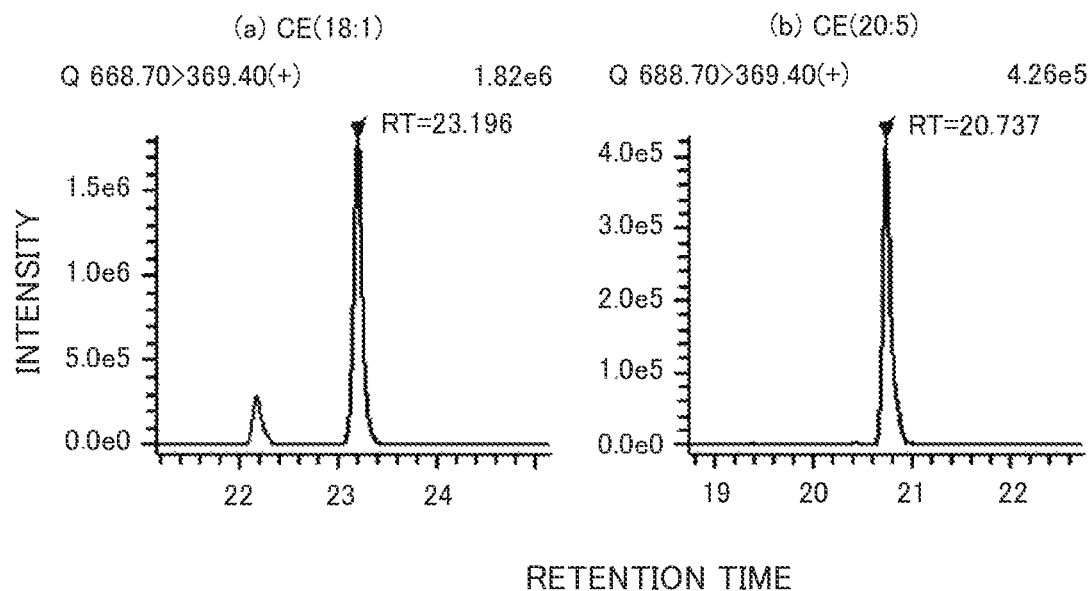

FIG. 8 (A) MARCH 2017
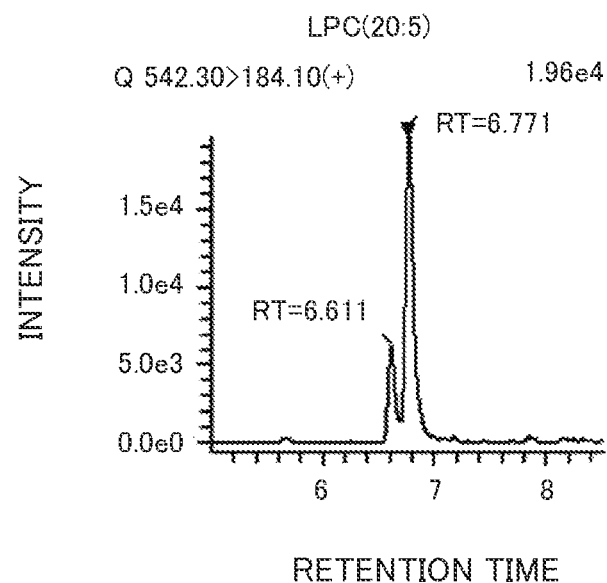
FIG. 8 (B) MARCH 2018
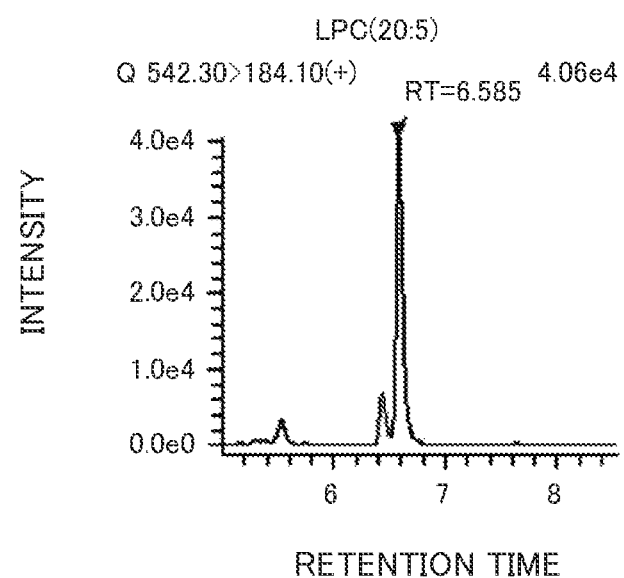

ANALYSIS METHOD AND ANALYTICAL DEVICE

CROSS REFERENCE TO RELATED APPLICATIONS

This application is a National Stage of International Application No. PCT/JP2019/009393 filed on Mar. 8, 2019, claiming priority based on Japanese Patent Application No. 2018-109023 filed on Jun. 6, 2018.

TECHNICAL FIELD

The present invention relates to an analysis method and an analytical device.

BACKGROUND ART

The analysis of each molecule constituting lipids contained in samples is very important for the analysis of biological samples, medical diagnosis and drug discovery, etc. Particularly, lipidomics, which comprehensively analyzes whole diverse molecules constituting lipids, is very useful in searching for disease biomarkers or research on disease mechanisms. In searching for novel biomarkers in lipidomics, samples are sequentially collected from many individuals over a long period, and stored. If some individuals have developed a particular disease, their stored samples can be retraced and analyzed to find a molecule related to the disease.

The quality evaluation of stored samples is important for properly analyzing samples containing lipids. In NPTL1, the amounts of phospholipids and cholesteryl ester in cryopreserved plasma were sequentially measured over 3 years or longer to evaluate the quantification accuracy of mass spectrometry, and findings about the stability of cryopreserved lipids have also been gained. NPTL2 has reported increase or decrease in the detection intensity of mass spectrometry between before and after leaving a blood sample, with regard to lipids and metabolites in the blood sample left at room temperature for several hours.

CITATION LIST

Non-Patent Literature

NPTL1: Laura A. Heiskanen, Matti Suoniemi, Hung Xuan Ta, Kirill Tarasov, and Kim Ekroos, "Long-Term Performance and Stability of Molecular Shotgun Lipidomic Analysis of Human Plasma Samples" Analytical Chemistry (USA), ACS Publications, September 2013, Volume 85, Issue 18, pp. 8757-8763

NPTL2: Beate Kamlage, Sandra Gonzalez Maldonado, Bianca Bethan, Erik Peter, Oliver Schmitz, Volker Liebenberg, Philipp Schatz "Quality markers addressing preanalytical variations of blood and plasma processing identified by broad and targeted metabolite profiling," Clinical Chemistry (USA), American Association for Clinical Chemistry, February 2014, Volume 60, Issue 2, pp. 399-412

SUMMARY OF INVENTION

Technical Problem

For quality evaluation of a stored sample or the like, it is desired that a degree of oxidation of the sample can be quantitatively evaluated by mass spectrometry.

Solution to Problem

According to the 1st aspect of the present invention, an analysis method comprises: subjecting a sample to liquid chromatography; performing first mass spectrometry of the sample subjected to the liquid chromatography to detect a first ion corresponding to cholesteryl ester and a second ion corresponding to cholesteryl ester peroxide; and analyzing a degree of oxidation of the sample based on a ratio between an intensity of the detected first ion and an intensity of the detected second ion.

According to the 2nd aspect of the present invention, it is preferred that the analysis method according to the 1st aspect further comprises calculating an index that indicates the degree of oxidation of the sample based on a ratio obtained by dividing any one of the intensity of the first ion and the intensity of the second ion by the other.

According to the 3rd aspect of the present invention, it is preferred that the analysis method according to the 2nd aspect further comprises outputting the index, or information that indicates the degree of oxidation of the sample based on the index.

According to the 4th aspect of the present invention, it is preferred that the analysis method according to the 2nd or 3rd aspect further comprises analyzing measurement data obtained by the first mass spectrometry based on the index.

According to the 5th aspect of the present invention, it is preferred that the analysis method according to any one of the 1st to 4th aspects further comprises: detecting respective sample-derived ions corresponding to components of the sample by the first mass spectrometry; calculating a sum of intensities of ions corresponding to phospholipids among the sample-derived ions; and normalizing an intensity of each of the detected sample-derived ions using the sum.

According to the 6th aspect of the present invention, in the analysis method according to the 5th aspect, it is preferred that the phospholipids include lysophospholipid, and phospholipid having a plurality of acyl groups.

According to the 7th aspect of the present invention, it is preferred that the analysis method according to the 5th or 6th aspect further comprises: when the first mass spectrometry is performed at least twice at a predetermined interval of time on the same sample, detecting a non-variation ion whose variation in the normalized intensity is equal to or less than a predetermined percentage by second mass spectrometry, and normalizing an intensity of each ion detected by the second mass spectrometry using the intensity of the non-variation ion.

According to the 8th aspect of the present invention, it is preferred that the analysis method according to any one of the 1st to 4th aspects further comprises normalizing intensities of respective sample-derived ions corresponding to components of the sample detected in the first mass spectrometry using an intensity of an ion corresponding to a predetermined substance, wherein the substance is at least one molecule selected from the group consisting of cholesteryl ester having an acyl group having a carbon number of 18 and 1 carbon-carbon double bond, cholesteryl ester having an acyl group having a carbon number of 20 and 5 carbon-carbon double bonds, lysophosphatidylcholine having an acyl group having a carbon number of 20 and 5 carbon-carbon double bonds, phosphatidylcholine having two acyl groups having a total carbon number of 32 and a total of 1 carbon-carbon double bond, phosphatidylcholine having two acyl groups having a total carbon number of 34 and a total of 1 carbon-carbon double bond, phosphatidylcholine having two acyl groups having a total carbon number of 36 and a total of 2 carbon-carbon double bonds, phosphatidylcholine having two acyl groups having a total carbon number of 38 and a total of 4 carbon-carbon double bonds, phosphatidylethanolamine having two acyl groups having a total carbon number of 34 and a total of 2 carbon-carbon double bonds, phosphatidylethanolamine having two acyl groups having a total carbon number of 36 and a total of 2 carbon-carbon double bonds, and phosphatidylethanolamine having two acyl groups having a total carbon number of 38 and a total of 4 carbon-carbon double bonds.

According to the 9th aspect of the present invention, in the analysis method according to the 8th aspect, it is preferred that an intensity of the sample-derived ion corresponding to each cholesteryl ester in the sample detected in the first mass spectrometry is normalized using a sum of intensities of ions corresponding to cholesteryl esters included in the substance.

According to the 10th aspect of the present invention, in the analysis method according to the 8th or 9th aspect, it is preferred that an intensity of the sample-derived ion corresponding to each lysophospholipid in the sample detected in the first mass spectrometry is normalized using an intensity of an ion corresponding to lysophosphatidylcholine included in the substance.

According to the 11th aspect of the present invention, in the analysis method according to any one of the 8th to 11th aspects, it is preferred that an intensity of the sample-derived ion corresponding to each phospholipid containing a plurality of acyl groups in the sample detected in the first mass spectrometry is normalized using a sum of intensities of ions corresponding to phosphatidylcholines and phosphatidylethanolamines included in the substance.

According to the 12th aspect of the present invention, it is preferred that the analysis method according to any one of the 1st to 4th aspects further comprises: detecting respective sample-derived ions corresponding to components of the sample by the first mass spectrometry; calculating a sum of intensities of ions corresponding to lysophospholipid and phospholipid having a plurality of acyl groups among the sample-derived ions; and normalizing respective intensities of the detected sample-derived ions using the sum, wherein the phospholipid excludes a molecule containing an acyl group having a carbon number of 20 and 4 carbon-carbon double bonds.

According to the 13th aspect of the present invention, in the analysis method according to any one of the 5th to 11th aspects, it is preferred that the sample-derived ions include a lipid molecule containing a fatty acid or acyl group having a carbon number of and 4 carbon-carbon double bonds; and the analysis method further comprises determining whether or not the sample has been obtained from a healthy individual based on a normalized intensity of an ion corresponding to the lipid molecule.

According to the 14th aspect of the present invention, in the analysis method according to any one of the 1st to 13th aspects, it is preferred that the sample is a sample stored in a state of blood.

According to the 15th aspect of the present invention, an analytical device comprises: a sample introduction part which introduces a sample; a liquid chromatograph which separates the sample; a mass spectrometry part which performs first mass spectrometry of the sample separated by the liquid chromatograph to detect a first ion corresponding to cholesteryl ester and a second ion corresponding to cholesteryl ester peroxide; and a degree-of-oxidation analysis part which analyzes a degree of oxidation of the sample based on a ratio between an intensity of the detected first ion and an intensity of the detected second ion.

Advantageous Effects of Invention

According to the present invention, quality of a stored sample can be evaluated by quantitatively evaluating a degree of oxidation of the sample by mass spectrometry.

BRIEF DESCRIPTION OF DRAWINGS

FIG. 7(A) shows a mass chromatogram showing a peak corresponding to cholesteryl ester obtained by the mass spectrometry of the sample in March 2017. FIG. 7(B) shows a mass chromatogram showing a peak corresponding to cholesteryl ester obtained by the mass spectrometry of the sample in March 2018.

FIG. 8(A) shows a mass chromatogram showing a peak corresponding to lysophosphatidylcholine obtained by the mass spectrometry of the sample in March 2017. FIG. 8(B) shows a mass chromatogram showing a peak corresponding to lysophosphatidylcholine obtained by the mass spectrometry of the sample in March 2018.

DESCRIPTION OF EMBODIMENTS

Figure 1:
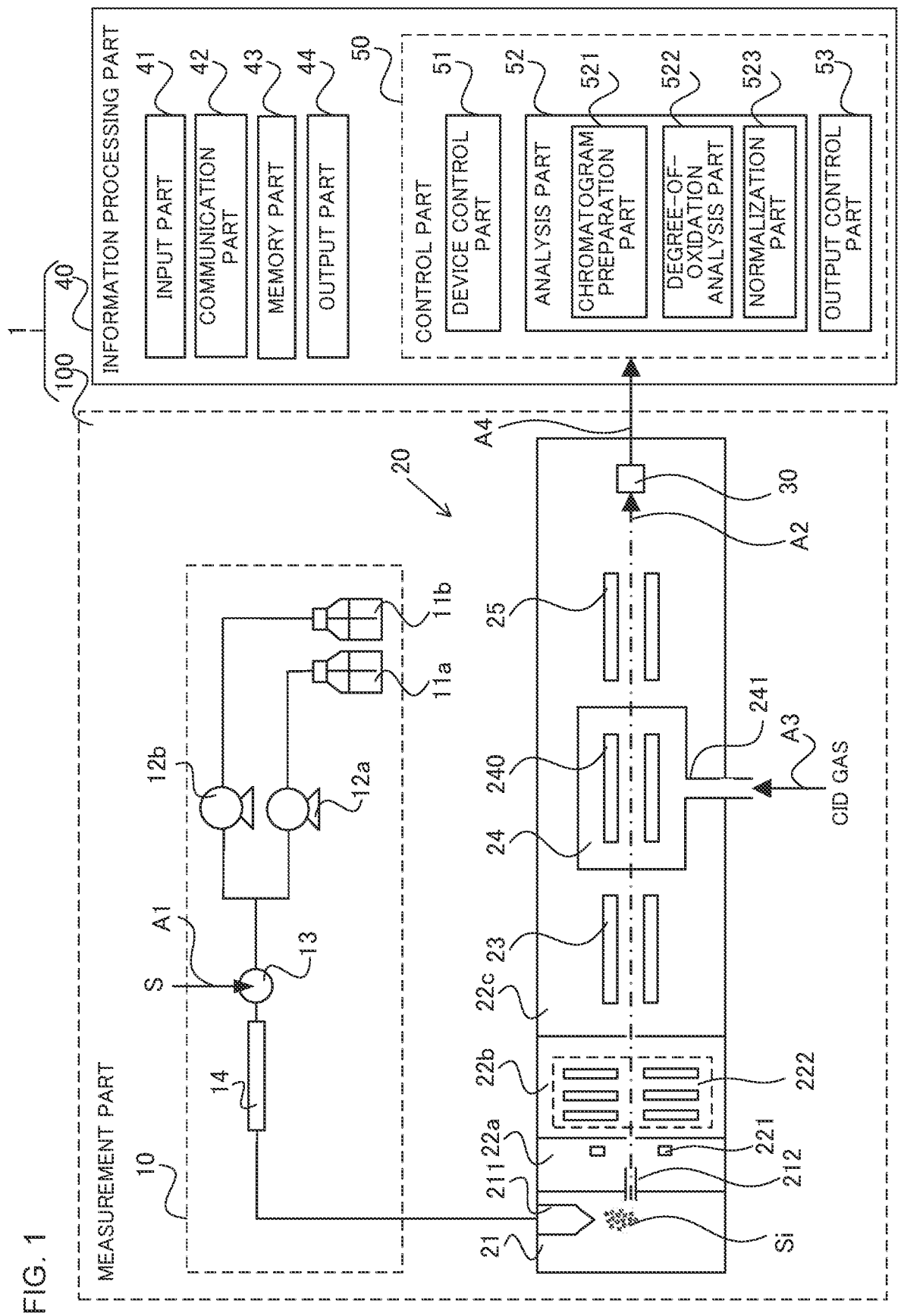
FIG. 1 is a conceptual diagram for illustrating an analytical device.

Hereinafter, modes for carrying out the present invention will be described with reference to the drawings. In the embodiments given below, "lipid" refers to an organism-derived substance containing a fatty acid or a hydrocarbon chain.

First Embodiment

The analysis method of the present embodiment involves detecting ions corresponding to cholesteryl ester and cholesteryl ester peroxide in a sample by liquid chromatography/mass spectrometry (LC/MS), and analyzing a degree of oxidation of the sample based on measurement data obtained by this detection.

The sample is a liquid or a solid containing lipids and is not particularly limited as long as the sample can be prepared as a sample for analysis to be introduced to a liquid chromatograph. The sample is preferably a body fluid, such as blood, obtained from a biological body such as a human from the viewpoint that the analysis method of the present embodiment is suitably used for biological or medical purposes. Alternatively, from a similar viewpoint, the sample is preferably a sample containing a solid, such as a tissue (e.g., an organ), cells, or exosomes, obtained from a biological body such as a human. Hereinafter, analysis using blood obtained by blood collection from a human as the sample will be described as an example.

A method for pretreating the sample is not particularly limited and can be any method by which analytes among molecules constituting lipids (hereinafter, referred to as lipid molecules) contained in the sample are separable and detectable by LC/MS. Such analyte lipid molecules are not particularly limited and can include cholesteryl ester and cholesteryl ester peroxide as well as cholesteryl ester hydroxide, phospholipid having only one acyl group (hereinafter, referred to as lysophospholipid), phospholipid having a plurality of acyl groups, triglycerol, and the like. The analyte lysophospholipid can include lysophosphatidylcholine. The analyte phospholipid can include phosphatidylcholine, phosphatidylethanolamine, phosphatidylserine, and the like.

It should be noted that molecules other than the lipid molecules may be included in the analytes. For example, cholesterol or a cholesterol derivative such as cholesterol sulfate can be used as an analyte.

Preferred examples of the pretreatment method include a method of extracting the lipid molecules, etc. with methanol. In this method, cryopreserved whole blood is weighed. Then, methanol is added thereto in an amount of a liquid such as several tens to several hundreds of times the volume of the blood, and the mixture is stirred to extract the lipid molecules into the methanol phase. After centrifugation, the supernatant is collected. The pretreatment method can be similarly performed using refrigerated blood or a sample other than blood. This permits rapid pretreatment of the sample and also facilitates automation. The sample thus pretreated is introduced to a liquid chromatograph of an analytical device.

It should be noted that, when the sample collected from a biological body contains a solid, a liquid such as a buffer solution is appropriately added thereto, and a tissue is disrupted and homogenized, for example. Then, liquid components can be subjected to pretreatment.

FIG. 1 is a conceptual diagram showing the configuration of an analytical device related to the analysis method of the present embodiment. The analytical device 1 includes a measurement part 100 and an information processing part 40. The measurement part 100 includes a liquid chromatograph 10 and a mass spectrometer 20.

It should be noted that the analytical device 1 may be integrated with a pretreatment part which performs pretreatment and includes a dispensing device and a centrifuge.

The liquid chromatograph 10 includes mobile phase containers 11a and 11b, liquid feed pumps 12a and 12b, a sample introduction part 13, and an analytical column 14. The mass spectrometer 20 includes an ionization chamber 21 having an ionization part 211, a first vacuum chamber 22a having an ion lens 221, a capillary 212 which introduces ions from the ionization chamber 21 to the first vacuum chamber 22a, a second vacuum chamber 22b having an ion guide 222, and a third vacuum chamber 22c. The third vacuum chamber 22c includes a first mass separation part 23, a collision cell 24, a second mass separation part 25, and a detection part 30. The collision cell 24 includes an aion guide 240 and a CID gas introduction port 241.

The information processing part 40 includes an input part 41, a communication part 42, a memory part 43, an output part 44, and a control part 50. The control part 50 includes a device control part 51, an analysis part 52, and an output control part 53. The analysis part 52 includes a chromatograph preparation part 521, a degree-of-oxidation analysis part 522, and a normalization part 523.

The liquid chromatograph (LC) 10 exploits the distinctive affinity of each component in the sample for a mobile phase and for a stationary phase of the analytical column 14 to separate the component and elute such components at different retention times. The liquid chromatograph 10 is not limited by its type as long as the analyte lipid molecules can be separated with the desired accuracy such that the lipid molecules can be separated and detected by the mass spectrometer 20. For example, a nano LC, a micro LC, a high-performance liquid chromatograph (HPLC) or an ultra-high-performance liquid chromatograph (UHPLC) can be used as the liquid chromatograph 10. The liquid chromatography has higher quantification accuracy than that of infusion analysis because the suppression of ionization, etc. is reduced.

The mobile phase containers 11a and 11b includes containers capable of storing a liquid, such as vials or bottles, and store mobile phases differing in composition from each other. The mobile phases stored in the mobile phase containers 11a and 11b are referred to as mobile phase A and mobile phase B, respectively. The mobile phase A and the mobile phase B are not particularly limited by their composition as long as the analyte lipid molecules can be separated with the desired accuracy. For example, an aqueous ammonium formate solution can be used as the mobile phase A, and a liquid containing acetonitrile and isopropanol at a predetermined volume ratio such as 1:1 can be used as the mobile phase B.

The liquid feed pumps 12a and 12b feed the mobile phase A and the mobile phase B, respectively, at predetermined flow rates. The mobile phase A and the mobile phase B sent from the liquid feed pumps 12a and 12b, respectively, are mixed midway through a flow channel and introduced to the sample introduction part 13. The liquid feed pumps 12a and 12b change the flow rates of the mobile phase A and the mobile phase B, respectively, and thereby change the composition of the mobile phase to be introduced to the analytical column 14 depending on time.

Data that indicates the composition of a mobile phase at each time from a point in time corresponding to the start of analysis such as the introduction of the sample is referred to as gradient data. The liquid feed pumps 12a and 12b are controlled by device control part 51 mentioned later based on the gradient data so that a mobile phase having the set composition is introduced to the analytical column 14. Time-dependent change in the composition of the mobile phase is not particularly limited as long as the analyte lipid molecules can be separated with the desired accuracy.

The sample introduction part 13 includes a sample introduction device such as an autosampler and introduces a pretreated sample S to the mobile phase (arrow A1). The sample S introduced by the sample introduction part 13 appropriately passes through a guard column (not shown) and is introduced to the analytical column 14.

The analytical column 14 has a stationary phase and exploits the distinctive affinity of each lipid molecule for the mobile phase and for the stationary phase to elute the analyte lipid molecules in the introduced sample S at different retention times. The analytical column 14 is not particularly limited by its type as long as the lipid molecules can be separated with the desired accuracy. A reverse-phase column is preferred from the viewpoint of easy handling and easy ionization in mass spectrometry. The stationary phase of the analytical column 14 is preferably, for example, silane bound with C8 or C18 linear hydrocarbon supported by a support such as a silica gel.

An elution sample containing the lipid molecules eluted from the analytical column 14 is introduced to the ionization part 21 of the mass spectrometer 20. An eluate from the analytical column 14 is preferably input to the mass spectrometer 20 by online control without the need of an operation, such as dispensing, by a user of the analytical device 1 (hereinafter, simply referred to as "user").

The mass spectrometer 20 performs tandem mass spectrometry on the elution sample introduced from the analytical column 14 to detect the analyte lipid molecules. The route of sample-derived ions Si derived from the sample S, obtained by the ionization of the elution sample is schematically shown by arrow A2 of an alternate long and short dash line.

The ionization part 21 of the mass spectrometer 20 ionizes the introduced elution sample. The ionization method is not particularly limited as long as the lipid molecules are ionized to an extent that the analyte lipid molecules are detected with the desired accuracy. In the case of performing LC/MS/MS as in the present embodiment, electrospray ionization (ESI) is preferred. In the following, embodiments with ESI will be described. A sample-derived ion Si obtained by the ionization of the elution sample exiting from the ion source 211 moves depending on difference in pressure between the ionization chamber 21 and the first vacuum chamber 22a, passes through the capillary 212, and enters into the first vacuum chamber 22a.

A degree of vacuum is the highest in the third vacuum chamber 22c, followed by that of the second vacuum chamber 22b and the first vacuum chamber 22a in this order, In the third vacuum chamber 22c, air is exhausted to high vacuum of, for example, 10-2 Pa or less through a vacuum pump (not shown). The sample-derived ions Si entering into the first vacuum chamber 22a pass through the ion lens 221 and are introduced to the second vacuum chamber 22b. The sample-derived ions Si entering into the second vacuum chamber 22b pass through the ion guide 222 and are introduced to the third vacuum chamber 22c. The sample-derived ions Si introduced to the third vacuum chamber 22c are emitted to the first mass separation part 23. The sample-derived ions Si, which pass through the ion lens 221, the ion guide 222, etc. before entering into the first mass separation part 23 are converged by electromagnetic action.

The first mass separation part 23 includes a quadrupole mass filter. The sample-derived ions Si having set m/z selectively pass as precursor ions through the quadrupole mass filter by electromagnetic action based on voltage applied to the quadrupole mass filter, and exit therefrom towards the collision cell 24. The first mass separation part 23 permits selective passage of precursor ions of the ionized analyte lipid molecules included in the sample-derived ions Si.

The collision cell 24 dissociates the ionized analyte lipid molecules through collision induced dissociation (CID) to generate fragment ions, while controlling the movement of the sample-derived ions Si by the ion guide 240. For CID, a gas containing argon, nitrogen, or the like (hereinafter, referred to as CID gas) against which the sample-derived ions Si are allowed to collide is introduced from the CID gas introduction port 241 (arrow A3) so as to attain a predetermined pressure within the collision cell. The sample-derived ions Si including the generated fragment ions exit therefrom toward the second mass separation part 25.

It should be noted that the dissociation method is not limited to CID as long as the fragment ions are detectable.

The second mass separation part 25 includes a quadrupole mass filter. The sample-derived ions Si having set m/z selectively pass as product ions through the quadrupole mass filter by electromagnetic action based on voltage applied to the quadrupole mass filter, and exit therefrom towards the detection part 30. The second mass separation part 25 permits selective passage of fragment ions of the analyte lipid molecules included in the sample-derived ions Si.

The detection part 30 has an ion detector such as a secondary electron multiplier or a photomultiplier and detects the entering sample-derived ions Si including the fragment ions of the analyte lipid molecules. The detection mode may be any of a positive ion mode which detects positive ions and a negative ion mode which detects negative ions. Detection signals obtained by detecting the sample-derived ions Si are A/D-converted by an A/D converter (not shown), and the resulting digital signals are input as measurement data to the control part 50 of the information processing part 40 (arrow A4).

The information processing part 40 has an information processing device such as a computer and not only appropriately serves as an interface with a user but performs processing, such as communication, memory, and arithmetic operation, on various pieces of data. The information processing part 40 serves as a processing device that performs the processing of control of the measurement part 100, analysis, and display.

It should be noted that the information processing part 40 may be configured as one device integrated with the liquid chromatograph 10 and/or the mass spectrometer 20. A portion of data that is used in the analysis method of the present embodiment may be stored in a remote server or the like, and a portion of arithmetic processing that is performed in the analysis method may be performed in a remote server or the like. The operation of each part of the measurement part 100 may be controlled by the information processing part 40 or may be controlled by a device constituting each part.

The input part 41 of the information processing part 40 is configured to comprise an input device such as a mouse, a keyboard, various buttons and/or a touch panel. The input part 41 accepts, from a user, for example, information necessary for processing by the control part 50, such as m/z values of the sample-derived ions Si to be detected.

The communication part 42 of the information processing part 40 is configured to comprise a communication device capable of communicating through wireless connection or wire-line connection via a network such as Internet. The communication part 42 appropriately sends and receives necessary data so as to receive data necessary for measurement by the measurement part 100 and to send data processed by the control part 50, such as analysis results from the analysis part 52.

The memory part 43 of the information processing part 40 has a non-volatile memory medium. The memory part 43 memorizes, for example, measurement data output from the measurement part 100, and a program for the control part 50 to execute processing.

The output part 44 of the information processing part 40 is controlled by the output control part 53 and configured to comprise a display device such as a liquid-crystal monitor and/or a printer. The output part 44 outputs information on measurement by the measurement part 100, analysis results from the analysis part 52, etc. by display on the display device or printing on a printing medium.

The control part 50 of the information processing part 40 is configured to comprise a processor such as CPU. The control part 50 performs various processes, such as control of the measurement part 100 and analysis of the measurement data output from the measurement part 100, by executing a program memorized in the memory part 43 or the like.

The device control part 51 of the processing part 50 controls the measurement operation of the measurement part 100 based on analysis conditions or the like set according to, for example, input mediated by the input part 41.

The analysis part 52 performs analysis such as analysis of the degree of oxidation of the sample S or quantification of the analyte lipid molecules based on the measurement data output from the measurement part 100.

The chromatogram preparation part 521 of the analysis part 52 prepares mass chromatogram data corresponding to a mass chromatogram. In the mass chromatogram data a retention time corresponds to detection intensity corresponding to a fragment ion of each analyte lipid molecule at the retention time. The mass chromatogram data prepared by the chromatogram preparation part 521 is memorized in the memory part 43.

The degree-of-oxidation analysis part 522 of the analysis part 52 analyzes the degree of oxidation of the sample S based on a ratio between the intensity of a detected fragment ion of cholesteryl ester (hereinafter, referred to as a non-peroxide ion) and the intensity of a detected fragment ion of cholesteryl ester peroxide (hereinafter, referred to as a peroxide ion). Values of peak intensities or peak areas (i.e., integrated intensity at a peak) corresponding to the peaks of the non-peroxide ion and the peroxide ion are preferably used as these intensities, though values used as these intensities are not particularly limited. For example, any statistical values or the like that indicate the amplitudes of detection signals corresponding to the non-peroxide ion and the peroxide ion can be used. In this context, the peak intensity refers to the maximum intensity at a peak. The degree-of-oxidation analysis part 522 preferably calculates statistical values such as peak intensities and peak areas by appropriately performing noise reduction processing such as smoothing or background removal.

The cholesteryl ester and the cholesteryl ester peroxide for use in the analysis of the degree of oxidation after mass spectrometry by the mass spectrometer 20 are not particularly limited and preferably have an acyl group with a carbon number of 18, more preferably an acyl group with a carbon number of 18 having two or 3 carbon-carbon double bonds. The degree-of-oxidation analysis part 522 preferably analyzes the degree of oxidation based on a ratio between the intensity of the non-peroxide ion and the intensity of the peroxide ion, as cholesteryl esters having acyl groups having the same carbon number and the same number of carbon-carbon double bonds. This achieves more accurate analysis of the degree of oxidation because molecules having the same configuration are analyzed for their degrees of oxidation by quantifying the non-peroxide and the peroxide.

It should be noted that the degree of oxidation of the sample S may be analyzed based on a ratio between the sum of intensities of a plurality of detected fragment ions corresponding to a plurality of cholesteryl esters, respectively, and the sum of intensities of a plurality of detected fragment ions corresponding to a plurality of cholesteryl ester peroxides, respectively, as the cholesteryl ester and the cholesteryl ester peroxide for use in the analysis of the degree of oxidation.

The degree-of-oxidation analysis part 522 calculates a ratio by dividing the intensity of the peroxide ion by the intensity of the non-peroxide ion (hereinafter, referred to as a degree-of-oxidation ratio), as an index for the degree of oxidation (hereinafter, referred to as a degree-of-oxidation index) of the sample S. A larger value of the degree-of-oxidation index is interpreted as a higher degree of oxidation of the sample S.

It should be noted that the degree-of-oxidation index may not be the value itself of the degree-of-oxidation ratio as long as the degree-of-oxidation index is based on the degree-of-oxidation ratio. Alternatively, a ratio obtained by dividing the intensity of the non-peroxide ion by the intensity of the peroxide ion may be used as the degree-of-oxidation ratio. In this case, a larger degree-of-oxidation index is interpreted as a lower degree of oxidation of the sample S. Thus, the degree-of-oxidation index is appropriately set in coordination with the degree of oxidation of the sample S.

The degree-of-oxidation analysis part 522 evaluates the degree of oxidation of the sample S based on the degree-of-oxidation index and a predetermined threshold (hereinafter, referred to as a degree-of-oxidation threshold). The degree-of-oxidation threshold is not particularly limited and can be appropriately set to an arbitrary value. For example, provided that two degree-of-oxidation thresholds are 0.5 and 2.0, the degree-of-oxidation analysis part 522 can evaluate the sample S as having high quality when the degree-of-oxidation index is less than 0.5, as having moderate quality when the degree-of-oxidation index is 0.5 or more and less than 2.0, and as having low quality when the degree-of-oxidation index is 2.0 or more. The number of degree-of-oxidation thresholds is not particularly limited and may be one or may be three or more. The value of the degree-of-oxidation threshold is appropriately preset from data, a theory, etc. that indicates the relationship between the degree of oxidation and the quality of the sample, and memorized in the memory part 43 or the like. The degree-of-oxidation index calculated by the degree-of-oxidation analysis part 522, or information that indicates the evaluated sample quality described above (e.g., "low", "moderate" or "high" quality) is memorized in the memory part 43.

The normalization part 523 of the analysis part 52 calculates a normalized intensity by dividing the intensity corresponding to the fragment ion of each analyte lipid molecule by a normalization factor (hereinafter, referred to as a normalized intensity). The normalization part 523 employs, as the normalization factor, an intensity of a detected ion (hereinafter, referred to as a non-variation ion), such as a fragment ion, corresponding to a substance given below (hereinafter, referred to as a non-variation substance) having a small amount of variation in long-term storage of a blood sample in Examples mentioned later. In this case as well, statistical values such as peak intensities or peak areas can be appropriately used as such intensities.

The non-variation substance is preferably at least one substance selected from the group consisting of cholesteryl ester having an acyl group having a carbon number of 18 and 1 carbon-carbon double bond, cholesteryl ester having an acyl group having a carbon number of 20 and 5 carbon-carbon double bonds, lysophosphatidylcholine having an acyl group having a carbon number of 20 and 5 carbon-carbon double bonds, phosphatidylcholine having two acyl groups having a total carbon number of 32 and a total of 1 carbon-carbon double bond, phosphatidylcholine having two acyl groups having a total carbon number of 34 and a total of 1 carbon-carbon double bond, phosphatidylcholine having two acyl groups having a total carbon number of 36 and a total of 2 carbon-carbon double bonds, phosphatidylcholine having two acyl groups having a total carbon number of 38 and a total of 4 carbon-carbon double bonds, phosphatidylethanolamine having two acyl groups having a total carbon number of 34 and a total of 2 carbon-carbon double bonds, phosphatidylethanolamine having two acyl groups having a total carbon number of 36 and a total of 2 carbon-carbon double bonds and phosphatidylethanolamine having two acyl groups having a total carbon number of 38 and a total of 4 carbon-carbon double bonds. This permits quantitative comparison even when different samples have different lipid concentrations, because a sample-derived ion Si corresponding to each component of the sample S is quantified with reference to a molecule having less variation during storage of the sample S.

In the non-variation substance, the phosphatidylcholine having two acyl groups having a total carbon number of 32 and a total of 1 carbon-carbon double bond is preferably phosphatidylcholine containing an acyl group having a carbon number of 16 and 0 carbon-carbon double bonds and an acyl group having a carbon number of 16 and 1 carbon-carbon double bond.

In the non-variation substance, the phosphatidylcholine having two acyl groups having a total carbon number of 34 and a total of 1 carbon-carbon double bond is preferably phosphatidylcholine containing an acyl group having a carbon number of 16 and 0 carbon-carbon double bonds and an acyl group having a carbon number of 18 and 1 carbon-carbon double bond.

In the non-variation substance, the phosphatidylcholine having two acyl groups having a total carbon number of 36 and a total of 2 carbon-carbon double bonds is preferably phosphatidylcholine having two acyl groups each having a carbon number of 18.

In the non-variation substance, the phosphatidylcholine having two acyl groups having a total carbon number of 38 and a total of 4 carbon-carbon double bonds is preferably phosphatidylcholine containing an acyl group having a carbon number of 18 and 0 carbon-carbon double bonds and an acyl group having a carbon number of 20 and 4 carbon-carbon double bonds.

In the non-variation substance, the phosphatidylethanolamine having two acyl groups having a total carbon number of 34 and a total of 2 carbon-carbon double bonds is preferably phosphatidylethanolamine containing an acyl group having a carbon number of 16 and 0 carbon-carbon double bonds and an acyl group having a carbon number of 18 and 2 carbon-carbon double bonds.

In the non-variation substance, the phosphatidylethanolamine having two acyl groups having a total carbon number of 36 and a total of 2 carbon-carbon double bonds is preferably phosphatidylethanolamine containing two acyl groups each having a carbon number of 18.

In the non-variation substance, the phosphatidylethanolamine having two acyl groups having a total carbon number of 38 and a total of 4 carbon-carbon double bonds is preferably phosphatidylethanolamine containing an acyl group having a carbon number of 18 and 0 carbon-carbon double bonds and an acyl group having a carbon number of 20 and 4 carbon-carbon double bonds.

The normalization part 523 preferably normalizes the intensity of the sample-derived ion Si corresponding to each cholesteryl ester in the sample S detected by mass spectrometry in the mass spectrometer 20, using the sum of intensities of non-variation ions corresponding to cholesteryl esters included in the non-variation substance. This permits quantitative comparison even when different samples have different total concentrations of cholesteryl esters.

The normalization part 523 preferably normalizes the intensity of the sample-derived ion Si corresponding to each lysophospholipid in the sample S detected by mass spectrometry in the mass spectrometer 20, using the intensity of a non-variation ion corresponding to lysophosphatidylcholine included in the non-variation substance. This permits quantitative comparison even when different samples have different concentrations of lysophospholipid such as lysophosphatidylcholine.

The normalization part 523 preferably normalizes the intensity of the sample-derived ion Si corresponding to each phospholipid containing a plurality of acyl groups in the sample S detected by mass spectrometry in the mass spectrometer 20, using the sum of intensities of non-variation ions corresponding to phosphatidylcholines and phosphatidylethanolamines included in the non-variation substance. This permits quantitative comparison even when different samples have different concentrations of phospholipids including a plurality of phospholipids such as phosphatidylcholines and phosphatidylethanolamines.

It should be noted that a method for normalization using the detection intensity of the non-variation substance by the normalization part 523 is not particularly limited. The normalization may be performed, for example, using the sum of intensities of non-variation ions corresponding to all the non-variation substances. This permits quantitative comparison even when different samples have different total lipid concentrations.

The non-variation substance is preset, and data on analysis conditions, such as a retention time and two m/z values for detection as a precursor ion and a product ion (hereinafter, the combination of these two m/z values is referred to as a transition), for the mass spectrometry of the non-variation substance is memorized in the memory part 43 or the like. The normalization part 523 calculates a detection intensity corresponding to the non-variation substance, with reference to this data, from the mass chromatogram data prepared by the chromatogram preparation part 521.

If data on the non-variation substance is not memorized in the memory part 43 or the like for a reason such as an unset non-variation substance or the mass spectrometer 20 does not detect a non-variation ion corresponding to the non-variation substance, the normalization part 523 performs normalization without using the intensity of the non-variation ion. In this case, the normalization part 523 calculates the sum of intensities of detected ions, such as fragment ions, corresponding to phospholipids among the sample-derived ions Si, and normalizes the respective intensities of the detected sample-derived ions Si using this sum to calculate normalized intensities (hereinafter, in this case as well, referred to as normalized intensities). In this context, the phospholipids preferably include lysophospholipid, and phospholipid containing a plurality of acyl groups. This achieves normalization more stably reflecting lipid concentrations even when the phospholipid containing a plurality of acyl groups is converted to lysophospholipid by the elimination of fatty acid during storage of the sample S or the lysophospholipid is no longer lysophospholipid through the binding of fatty acid, because the value of the normalization factor does not vary.

It should be noted that when normalization using the non-variation substance is possible, data normalized using the sum of intensities of ions corresponding to phospholipids may also be prepared and used for analysis.

In the method of searching for and selecting the non-variation substance as described above, when mass spectrometry is performed at least twice at a predetermined interval of time on the same sample S, a substance corresponding to an ion whose variation in intensity normalized using the sum of intensities of ions corresponding to phospholipids is equal to or less than a predetermined percentage can be selected as the non-variation substance. The predetermined interval of time is appropriately set to 1 month or longer, 1 year or longer, or the like. The predetermined percentage is appropriately set to 20% or less, 15% or less, 10% or less, or the like.

The analysis part 52 analyzes the measurement data obtained by the mass spectrometry of the sample S based on the degree-of-oxidation index calculated by the degree-of-oxidation analysis part 522, or information that indicates the evaluated quality of the sample S. For example, when the evaluated quality of the sample S is low, the analysis part 52 can avoid conducting a portion of analysis because of low reliability.

The output control part 53 prepares an output image involving, for example, information on measurement conditions for the measurement part 100 and/or analysis results from the analysis part 52, etc., and allows the output part 44 to output this image.

The output control part 53 prepares an output image involving the degree-of-oxidation index, or information that indicates the degree of oxidation of the sample S based on the degree-of-oxidation index, and allows the output part 44 to output this image.

Figure 2:
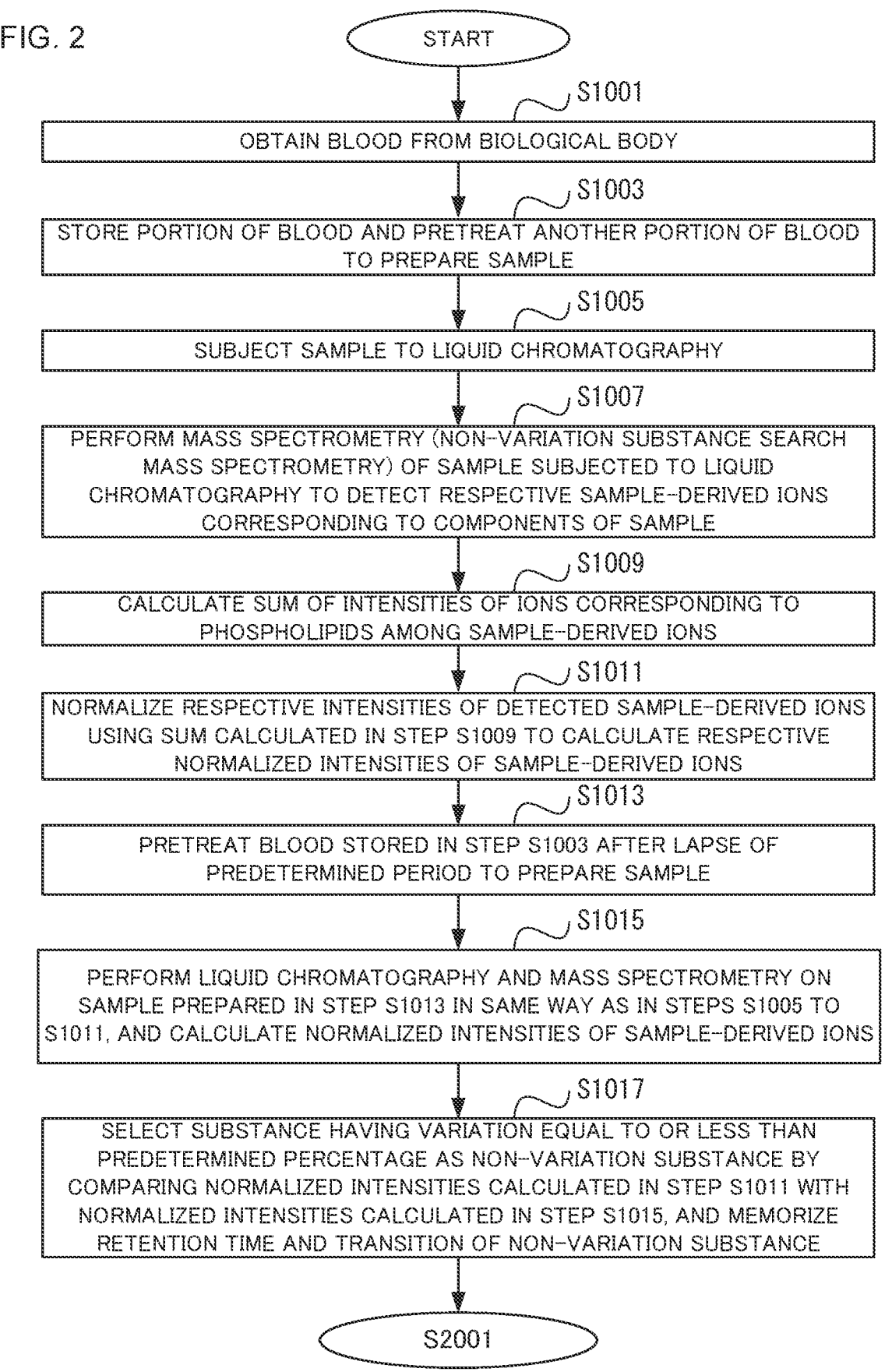
FIG. 2 is a flow chart showing flow of an analysis method of one embodiment.
Figure 3:
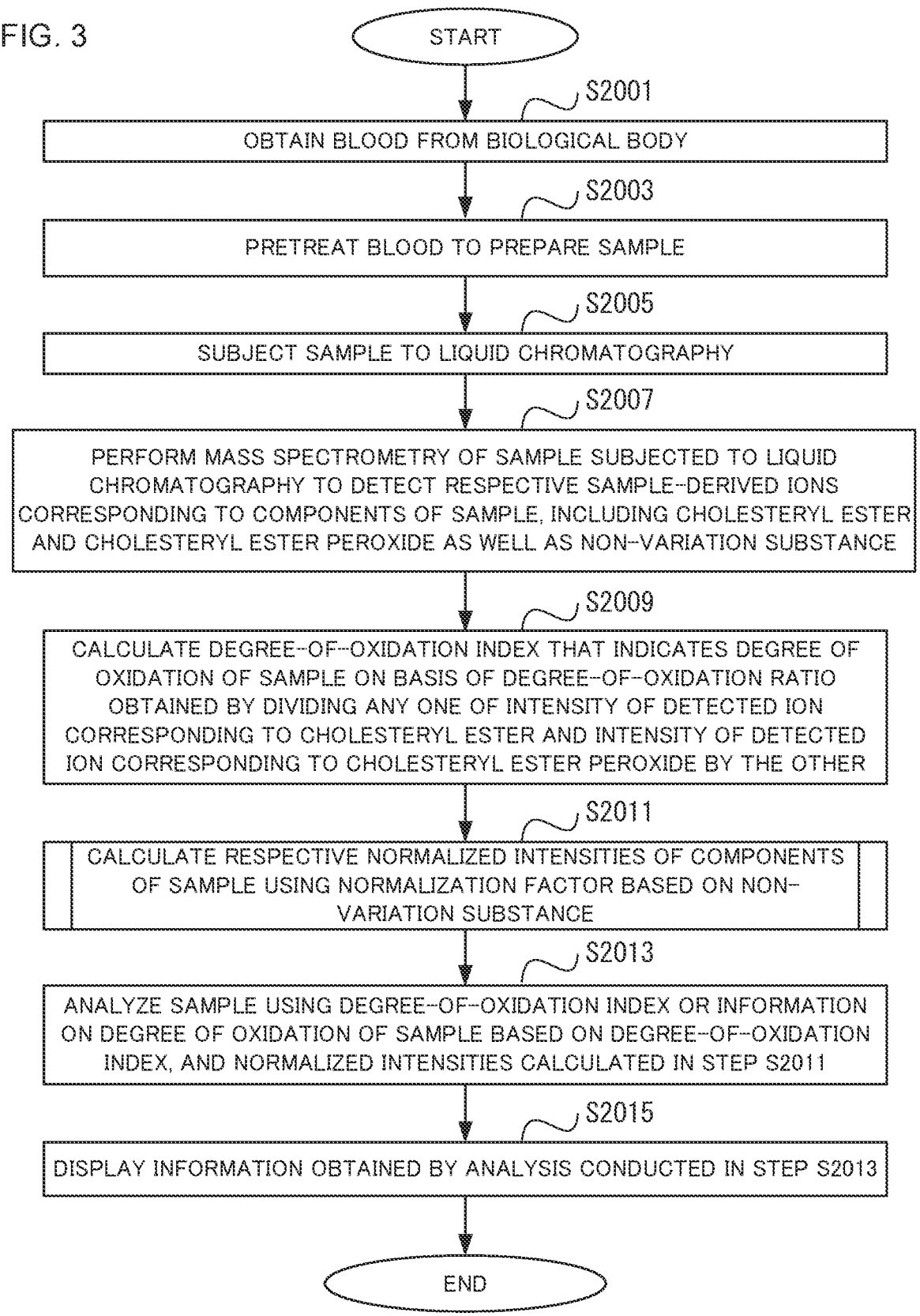
FIG. 3 is a flow chart showing the flow of the analysis method of the embodiment.
Figure 4:
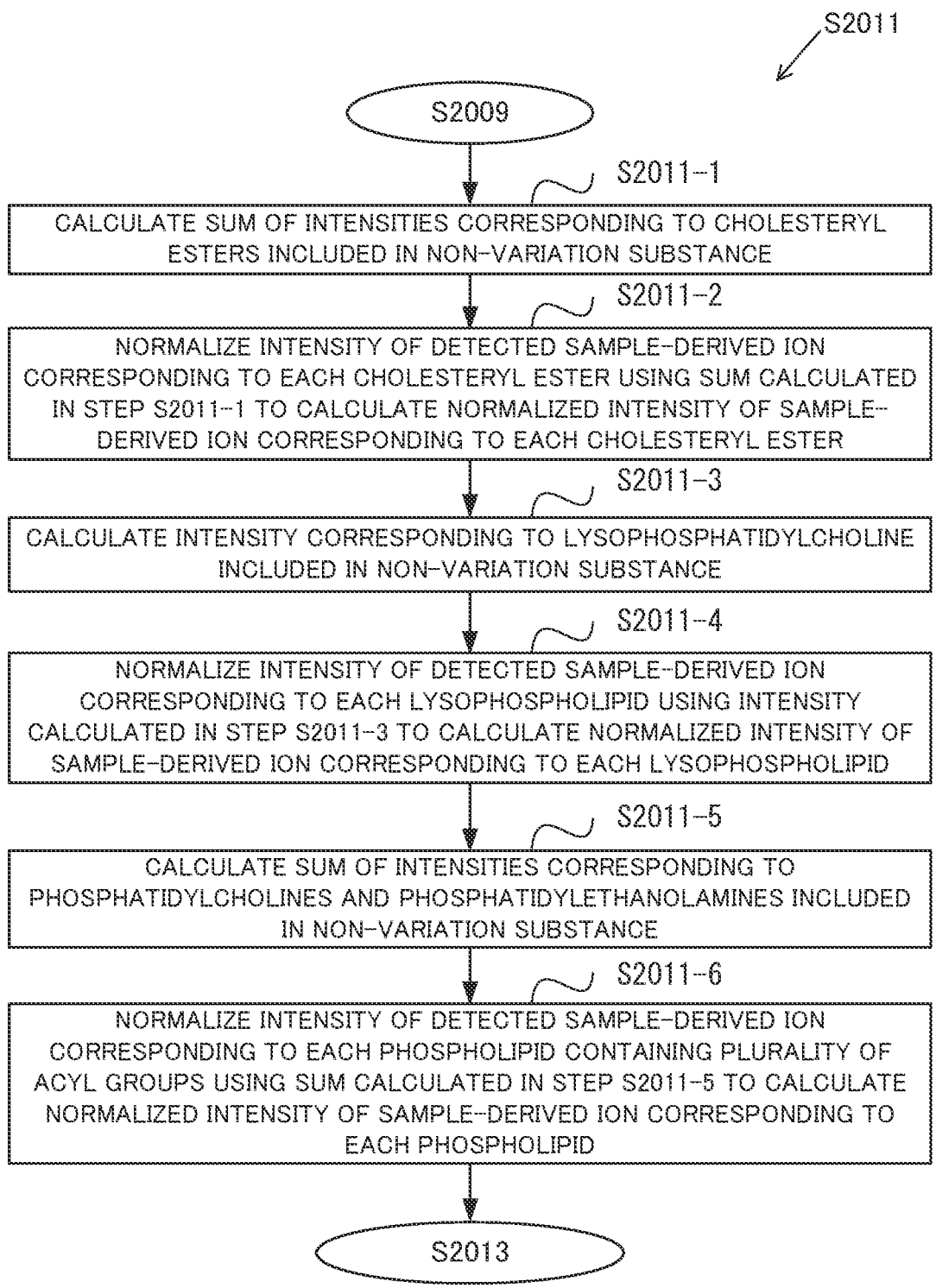
FIG. 4 is a flow chart showing the flow of the analysis method of the embodiment.

Each of FIGS. 2 to 4 is a flow chart showing the flow of the analysis method of the present embodiment. FIG. 2 is a flow chart showing the flow of mass spectrometry for searching for and setting a non-variation substance (hereinafter, referred to as non-variation substance search mass spectrometry). Each of FIGS. 3 and 4 is a flow chart showing the flow of an analysis method of conducting analysis using a normalization factor based on the set non-variation substance. Provided that the non-variation substance is known, each step of the flow chart of FIG. 2 may not be performed.

It should be noted that the mass spectrometry of FIG. 2 through the mass spectrometry of FIG. 4 may be performed with different analytical devices.

In step S1001 (FIG. 2), blood is obtained from a biological body by a medical worker or the like. After the completion of step S1001, step S1003 is started. In step S1003, a portion of the obtained blood is stored by a medical worker, an analyst or a user or the like, and another portion of the blood is pretreated to prepare sample S. After the completion of step S1003, step S1005 is started.

In step S1005, the sample introduction part 13 introduces the sample S to the liquid chromatograph 10 where the sample S is subjected to liquid chromatography. After the completion of step S1005, step S1007 is started. In step S1007, the mass spectrometer performs the mass spectrometry (non-variation substance search mass spectrometry) of the sample S subjected to liquid chromatography to detect respective sample-derived ions Si corresponding to components of the sample S. After the completion of step S1007, step S1009 is started.

In step S1009, the normalization part 523 calculates a sum of intensities of ions corresponding to phospholipids among the sample-derived ions Si. After the completion of step S1009, step S1011 is started. In step S1011, respective intensities of the detected sample-derived ions Si are normalized using the sum calculated in the step S1009 to calculate respective normalized intensities of the sample-derived ions Si. After the completion of step S1011, step S1013 is started.

In step S1013, the blood stored in the step S1003 is pretreated by a medical worker, an analyst or a user or the like after a lapse of a predetermined period to prepare sample S. After the completion of step S1013, step S1015 is started. In step S1015, the analytical device 1 performs liquid chromatography and non-variation substance search mass spectrometry on the sample S prepared in the step S1015 in the same way as in the steps S1005 to S1011, and calculates normalized intensities of sample-derived ions Si. After the completion of step S1015, step S1017 is started.

In step S1017, the analysis part 52 selects a substance having variation equal to or less than a predetermined percentage as a non-variation substance by comparing the normalized intensities calculated in the step S1011 with the normalized intensities calculated in the step S1015, and the memory part 43 memorizes a retention time of the non-variation substance and a transition for the mass spectrometry of the non-variation substance. After the completion of step S1017, the processing of searching for the non-variation substance is completed, and step S2001 is started to conduct analysis using a normalization factor based on the non-variation substance.

In step S2001 (FIG. 3), blood is obtained from a biological body by a medical worker or the like. After the completion of step S2001, step S2003 is started. The biological body may be an individual different from the individual from which the blood is obtained in the step S1001, or may be the same individual. In step S2003, the obtained blood is pretreated by a medical worker, an analyst or a user or the like to prepare sample S. After the completion of step S2003, step S2005 is started.

In step S2005, the sample introduction part 13 introduces the sample S to the liquid chromatograph 10 where the sample S is subjected to liquid chromatography. After the completion of step S2005, step S2007 is started. In step S2007, the mass spectrometer performs the mass spectrometry of the sample S subjected to liquid chromatography to detect respective sample-derived ions Si corresponding to components of the sample S, including cholesteryl ester and cholesteryl ester peroxide as well as a non-variation substance. After the completion of step S2007, step S2009 is started.

In step S2009, the degree-of-oxidation analysis part 522 calculates a degree-of-oxidation index that indicates the degree of oxidation of the sample S based on a degree-of-oxidation ratio obtained by dividing any one of the intensity of the detected ion corresponding to cholesteryl ester and the intensity of the detected ion corresponding to cholesteryl ester peroxide by the other. After the completion of step S2009, step S2011 is started.

In step S2011, the normalization part 523 calculates respective normalized intensities of components of the sample S using a normalization factor based on the non-variation substance.

FIG. 4 is a flow chart showing the flow of the step S2011. In step S2011-1, the normalization part 523 calculates a sum of intensities corresponding to cholesteryl esters included in the non-variation substance. After the completion of step S2011-1, step S2011-2 is started. In step S2011-2, the normalization part 523 normalizes an intensity of the detected sample-derived ion Si corresponding to each cholesteryl ester using the sum calculated in the step S2011-1 to calculate a normalized intensity of the sample-derived ion Si corresponding to each cholesteryl ester. After the completion of step S2011-2, step S2011-3 is started.

In step S2011-3, the normalization part 523 calculates an intensity corresponding to lysophosphatidylcholine included in the non-variation substance. After the completion of step S2011-3, step S2011-4 is started. In step S2011-4, the normalization part 523 normalizes an intensity of the detected sample-derived ion Si corresponding to each lysophospholipid using the intensity calculated in the step S2011-3 to calculate a normalized intensity of the sample-derived ion Si corresponding to each lysophospholipid. After the completion of step S2011-4, step S2011-5 is started.

In step S2011-5, the normalization part 523 calculates a sum of intensities corresponding to phosphatidylcholines and phosphatidylethanolamines included in the non-variation substance. After the completion of step S2011-5, step S2011-6 is started. In step S2011-6, the normalization part 523 normalizes an intensity of the detected sample-derived ion Si corresponding to each phospholipid containing a plurality of acyl groups using the sum calculated in the step S2011-5 to calculate a normalized intensity of the sample-derived ion Si corresponding to each phospholipid mentioned above. After the completion of step S2011-6, step S2013 is started.

It should be noted that the order of normalization of the intensities of the sample-derived ions Si as to the cholesteryl ester, the lysophospholipid and the phospholipid mentioned above is not particularly limited.

Referring back to FIG. 3, in step S2013, the analysis part 52 analyzes the sample S using the degree-of-oxidation index or information on the degree of oxidation of the sample S based on the degree-of-oxidation index, and the normalized intensities calculated in the step S2011. After the completion of step S2013, step S2015 is started. In step S2015, the output part 44 displays information obtained by the analysis conducted in the step S2013. After the completion of step S2015, the processing is completed.

The aforementioned embodiment produces the following working effects.

(1) The analysis method of the present embodiment comprises: subjecting a sample S to liquid chromatography; performing mass spectrometry of the sample S subjected to liquid chromatography to detect a non-peroxide ion corresponding to cholesteryl ester and a peroxide ion corresponding to cholesteryl ester peroxide; and analyzing a degree of oxidation of the sample S based on a ratio between an intensity of the detected non-peroxide ion and an intensity of the detected peroxide ion. This achieves quantitative evaluation of the degree of oxidation of the sample S using mass spectrometry to evaluate the quality of stored sample S.

(2) In the analysis method of the present embodiment and the analytical device 1, the degree-of-oxidation analysis part 522 can calculate a degree-of-oxidation index that indicates the degree of oxidation of the sample S based on a degree-of-oxidation ratio obtained by dividing any one of the intensity of the non-peroxide ion and the intensity of the peroxide ion by the other. This achieves quantitative comparison of the degree of oxidation of the sample S using the index.

(3) In the analysis method of the present embodiment and the analytical device 1, the output part 44 outputs the degree-of-oxidation index, or information that indicates the degree of oxidation of the sample S based on the degree-of-oxidation index. This can easily inform a user or the like of the degree of oxidation of the sample S based on the quantitative value.

(4) In the analysis method of the present embodiment and the analytical device 1, the analysis part 52 analyzes the measurement data obtained by the mass spectrometry of the sample S based on the degree-of-oxidation index. This achieves more precise analysis of the measurement data based on the quality, such as the degree of oxidation, of the sample S.

(5) In the analysis method of the present embodiment and the analytical device 1, the normalization part 523 normalizes intensities of respective sample-derived ions Si corresponding to components of the sample S detected in mass spectrometry using an intensity of an ion corresponding to a preset non-variation substance. This achieves quantitative comparison of analyte lipid molecules even when different samples S have different lipid concentrations.

(6) The analysis method of the present embodiment comprises, when non-variation substance search mass spectrometry is performed at least twice at a predetermined interval of time on the same sample S, detecting a non-variation ion whose variation in normalized intensity is equal to or less than a predetermined percentage by subsequent mass spectrometry, and normalizing respective intensities of sample-derived ions Si detected by this mass spectrometry using an intensity of the above non-variation ion. This achieves quantitative comparison of the amounts of analyte lipid molecules even when different samples S have different lipid concentrations, based on a non-variation substance obtained by actual mass spectrometry.

(7) In the analysis method of the present embodiment, the sample S is a sample stored in the state of blood. This allows many findings to be gained by the analysis of lipid molecules in rapidly and conveniently collectable blood containing diverse components.

(8) The analytical device of the present embodiment comprises: a sample introduction part 13 which introduces sample S; a liquid chromatograph 10 which separates the sample S; a mass spectrometry part (mass spectrometer 20) which performs mass spectrometry of the sample S separated in the liquid chromatograph 10 to detect a non-peroxide ion and a peroxide ion; and a degree-of-oxidation analysis part 522 which analyzes a degree of oxidation of the sample S based on a ratio between an intensity of the detected non-peroxide ion and an intensity of the detected peroxide ion. This achieves quantitative evaluation of the degree of oxidation of the sample S using mass spectrometry to evaluate the quality of stored sample S.

Modifications as given below are also included in the scope of the present invention and may be combined with the aforementioned embodiment. In the following Variations, the same reference signs will be used to designate sites exhibiting the same or similar structures or functions as in the aforementioned embodiment, so that the description will be omitted as appropriate.

Variation 1

In the aforementioned embodiment, the mass spectrometer 20 is a tandem mass spectrometer which performs mass-separation through two quadrupole mass filters. The configuration of the mass spectrometer 20, the type of the mass spectrometer 20, and the method for mass spectrometry are not particularly limited as long as sample-derived ions Si corresponding to analyte lipid molecules in the sample S are detectable with the desired accuracy. For example, the sample S may be ionized by probe electrospray ionization which performs ionization by applying high voltage to a probe attached to the sample S. For the details of the probe electrospray ionization, see International Publication No. WO 2010/047399.

Variation 2

In the aforementioned embodiment, the degree-of-oxidation index is calculated based on a ratio between an intensity of a detected ion corresponding to cholesteryl ester and an intensity of a detected ion corresponding to cholesteryl ester peroxide. However, the degree-of-oxidation index may be calculated based on a ratio between an intensity of a detected ion corresponding to cholesteryl ester and an intensity of a detected ion corresponding to cholesteryl ester hydroxide or cholesteryl sulfate. Since marked increase in the amounts of the cholesteryl ester hydroxide and the cholesteryl sulfate is observed in an oxidized sample, these can be properly used for the degree-of-oxidation index.

Variation 3

In the aforementioned embodiment, when a normalization factor is calculated from the sum of intensities of a plurality of detected ions, this sum may exclude an intensity of a detected ion, such as a fragment ion, corresponding to a molecule having an acyl group having a carbon number of 20 and 4 carbon-carbon double bonds. This molecule preferably has an acyl group corresponding to arachidonic acid. The arachidonic acid is cleaved from phospholipids by an enzyme (PLA2) when infection, trauma, or the like occurs in a biological body such as a human. Thus, there is a possibility that the amount of arachidonic acid in phospholipids is decreased due to various diseases including diseases having chronic inflammation, such as allergic diseases (e.g., atopic dermatitis and asthma) and diabetes mellitus. Thus, the normalization factor excluding an intensity of an ion corresponding to a molecule containing arachidonic acid or an acyl group corresponding to arachidonic acid (hereinafter, referred to as "arachidonic acid, etc.") allows analyte lipid molecules to be analyzed precisely using the more stable normalization factor.

For example, when the normalization part 523 calculates a normalization factor from the sum of intensities of ions corresponding to phospholipids including lysophospholipid, the phospholipids can exclude phospholipid containing arachidonic acid, etc. In another example, the normalization part 523 can perform normalization using an intensity of an ion corresponding to at least one member selected from the group consisting of non-variation substances containing no arachidonic acid, etc., i.e., cholesteryl ester having an acyl group having a carbon number of 18 and 1 carbon-carbon double bond, cholesteryl ester having an acyl group having a carbon number of 20 and 5 carbon-carbon double bonds, lysophosphatidylcholine having an acyl group having a carbon number of 20 and 5 carbon-carbon double bonds, phosphatidylcholine having two acyl groups having a total carbon number of 32 and a total of 1 carbon-carbon double bond, phosphatidylcholine having two acyl groups having a total carbon number of 34 and a total of 1 carbon-carbon double bond, phosphatidylcholine having two acyl groups having a total carbon number of 36 and a total of 2 carbon-carbon double bonds, phosphatidylethanolamine having two acyl groups having a total carbon number of 34 and a total of 2 carbon-carbon double bonds and phosphatidylethanolamine having two acyl groups having a total carbon number of 36 and a total of 2 carbon-carbon double bonds, among the aforementioned non-variation substances.

The analysis part 52 may determine whether the sample S is derived from a healthy person or derived from a human having a disease such as chronic inflammation, using the intensity of the detected ion, such as a fragment ion, corresponding to the molecule containing arachidonic acid, etc. The output control part 53 may allow the output part 44 to output information on the determination. The analysis part 52 performs this determination based on a preliminarily obtained threshold based on a detection intensity for a sample obtained from a healthy person and a detection intensity for a sample obtained from a human having a disease such as chronic inflammation. A value appropriately normalized with the aforementioned normalization factor can be used as the intensity of the ion corresponding to the molecule containing arachidonic acid, etc.

In the analysis method of the present Variation, the sample-derived ions Si include a lipid molecule containing a fatty acid or acyl group having a carbon number of and 4 carbon-carbon double bonds, and the analysis part 52 determines whether or not the sample S has been obtained from a healthy individual based on a normalized intensity of an ion corresponding to the lipid molecule. This achieves analysis of a health condition of the biological body from which the sample S is derived, and also achieves quality evaluation of the sample S from the viewpoint of the health condition of the biological body at the time of collection.

The present invention is not limited by the contents of the embodiments described above. Other possible aspects or embodiments are also included in the scope of the present invention without departing from the technical idea of the present invention.

EXAMPLES

In Examples given below, experimental results of subjecting a portion of blood collected from a human to mass spectrometry in March 2017, refrigerating another portion thereof, and subjecting this portion to mass spectrometry in March 2018 to analyze variation in components in the blood, and experimental results of analyzing the constitution of an acyl group of each compound in May 2017 will be described.

It should be noted that the present invention is not limited by numerical values and conditions shown in Examples given below.

Mass spectrometry performed in March 2017 and March 2018

Pretreatment

500 μL of methanol was added to 5 μL of whole blood, and the mixture was stirred for several minutes to extract lipid components, followed by centrifugation. 1 μL of the supernatant was collected and used as a sample to be introduced to a liquid chromatograph-mass spectrometer.

Conditions for Liquid Chromatography

The sample was separated by liquid chromatography under the following conditions.

System: LCMS-8060 (Shimadzu Corp.)
Analytical column: Kinetex C8 (Phenomenex Inc.) (inside diameter: 2.1 mm, length: 150 mm, particle size: 2.6 μm)
Injection volume: 3 μL
Column temperature: 45° C.
Mobile phase:
  (A) a 20 mM aqueous ammonium formate solution
  (B) a solution of acetonitrile and isopropanol mixed at a volume ratio of 1:1 Flow rate: 0.3 mL/min
Gradient Program:

| Time (min) | Concentration (%) of mobile phase B |
|---|---|
| 0 | 20 |
| 1 | 20 |
| 2 | 40 |
| 25 | 92.5 |

The concentration of mobile phase B was nonlinearly changed against time from 2 minutes through 25 minutes in order to increase difference in elution time among components at elution times of diacylphospholipids.

Conditions for Mass Spectrometry

The elution sample eluted in the liquid chromatography was detected by tandem mass spectrometry with connection directly to an elution port.

System: LCMS-8060 (Shimadzu Corp.)
Ionization method: electrospray ionization, positive ion mode/negative ion mode
Measurement mode: multiple reaction monitoring (MRM)
Temperature:
  Desolvation Line (DL) temperature: 250° C.
  Heat block temperature: 400° C.
  Interface temperature (which corresponds to the temperature of heating gas around an ionization part):—
Interface voltage (voltage applied to the entrance of DL from the tip of a capillary): 1.0 kV Gas flow rate:
  Nebulizer gas flow rate: 2.0 L/min
  Driving gas flow rate: 10.0 L/min
  Heating gas flow rate: 10.0 L/min Tables A and B given below show the retention time and a transition of each compound contained in the elution sample, a peak intensity at each transition, and a normalized intensity obtained by dividing the peak intensity by the sum of intensities of peaks of detected phospholipids including lysophospholipid. Table A is based on the mass spectrometry performed in March 2017, and Table B is based on the mass spectrometry performed in March 2018. Table B further shows the rate of increase in the normalized intensity in the mass spectrometry performed in March 2018 with respect to the normalized intensity in the mass spectrometry performed in March 2017.

In the compound names, CE refers to cholesteryl ester, Chol refers to cholesterol, Chol_sulfate refers to cholesterol sulfate, LPC refers to lysophosphatidylcholine, LPE refers to lysophosphatidylethanolamine, PC refers to phosphatidylcholine, PE refers to phosphatidylethanolamine, and PS refers to phosphatidylserine. In the description of x:y in the compound names, x represents the total carbon number in acyl groups contained in each compound, and y represents the total number of carbon-carbon double bonds in the acyl groups contained in each compound. CE18:2-OH is cholesteryl ester hydroxide having an acyl group having a carbon number of 18 and 2 carbon-carbon double bonds. CE18:2-OOH is cholesteryl ester peroxide having an acyl group having a carbon number of 18 and 2 carbon-carbon double bonds. CE18:3-OOH is cholesteryl ester peroxide having an acyl group having a carbon number of 18 and 3 carbon-carbon double bonds.

In the description of the transition, m/z of a precursor ion is shown on the left side of ">", and m/z of a product ion is shown on the right side of ">".

TABLE 1

Table A: Measurement Conditions and Measurement Results for Mass Spectrometry of Each Compound (March 2017)

| ID | Compound Name | Retention Time | Transition | Peak Intensity | Normalized Intensity |
|---|---|---|---|---|---|
| 1 | PS(40:6) | 13.404 | 836.55 > 651.50 | 139781 | 0.1822112 |
| 2 | CE 18:3 | 22.624 | 664.70 > 369.40 | 492633 | 0.6421705 |
| 3 | CE 22:5 | 23.263 | 716.70 > 369.40 | 36362 | 0.0473996 |
| 4 | PE(38:6) | 14.329 | 764.50 > 623.50 | 46653 | 0.0608144 |
| 5 | PE(38:5) | 14.816 | 766.55 > 625.50 | 38282 | 0.0499024 |
| 6 | PC(34:4) | 13.484 | 754.55 > 184.10 | 39873 | 0.0519763 |
| 7 | CE 22:4 | 23.967 | 718.70 > 369.40 | 9170 | 0.0119535 |
| 8 | PC(34:2) | 14.583 | 758.55 > 184.10 | 18628037 | 24.28253 |
| 9 | PC(36:5) | 13.76 | 780.55 > 184.10 | 509801 | 0.6645498 |
| 10 | PC(34:3) | 13.852 | 756.55 > 184.10 | 276084 | 0.3598886 |
| 11 | CE 20:4 | 22.961 | 690.70 > 369.40 | 3806809 | 4.9623561 |
| 12 | CE 18:2 | 23.566 | 666.70 > 369.40 | 11895559 | 15.506425 |
| 13 | LPC(18:2) | 7.416 | 520.35 > 184.10 | 1128047 | 1.4704628 |
| 14 | PE(36:4) | 14.64 | 740.50 > 599.50 | 126536 | 0.1649457 |
| 15 | CE 22:6 | 22.276 | 714.70 > 369.40 | 493268 | 0.6429982 |
| 16 | PC(38:6) | 14.156 | 806.55 > 184.10 | 1741634 | 2.2703025 |
| 17 | PS(40:5) | 13.649 | 838.55 > 653.55 | 10303 | 0.0134304 |
| 18 | PE(36:3) | 14.929 | 742.55 > 601.50 | 52059 | 0.0678614 |
| 19 | LPE(18:2) | 7.53 | 478.30 > 337.25 | 2402 | 0.0031311 |
| 20 | PC(36:4) | 14.465 | 782.55 > 184.10 | 8199413 | 10.688324 |
| 21 | Chol | 13.402 | 369.30 > 161.10 | 40309 | 0.0525447 |
| 22 | PS(38:5) | 13.049 | 810.55 > 625.50 | 1795 | 0.0023399 |
| 23 | CE 20:5 | 21.968 | 688.70 > 369.40 | 265414 | 0.3459797 |

TABLE 2

Table A (Sequel): Measurement Conditions and Measurement Results for Mass Spectrometry of Each Compound (March 2017)

| ID | Compound Name | Retention Time | Transition | Peak Intensity | Normalized Intensity |
|---|---|---|---|---|---|
| 24 | PE(36:2) | 15.728 | 744.55 > 603.55 | 91200 | 0.1188835 |
| 25 | PE(38:4) | 15.614 | 768.55 > 627.55 | 113102 | 0.1474338 |
| 26 | PC(38:5) | 14.645 | 808.60 > 184.10 | 428711 | 0.5588451 |
| 27 | PS(38:4) | 13.668 | 812.55 > 627.50 | 62115 | 0.0809698 |
| 28 | PC(32:1) | 14.39 | 732.55 > 184.10 | 669338 | 0.8725138 |
| 29 | PC(36:3) | 14.86 | 784.60 > 184.10 | 3436522 | 4.4796694 |
| 30 | PC(40:5) | 15.445 | 836.60 > 184.10 | 234049 | 0.305094 |
| 31 | PE(34:2) | 14.745 | 716.50 > 575.50 | 92930 | 0.1211387 |
| 32 | PC(38:4) | 15.468 | 810.60 > 184.10 | 3514268 | 4.581015 |
| 33 | LPC(20:5) | 6.771 | 542.30 > 184.10 | 19383 | 0.0252667 |
| 34 | PC(34:1) | 15.396 | 760.60 > 184.10 | 9140113 | 11.914571 |
| 35 | PC(36:2) | 15.612 | 786.60 > 184.10 | 8108316 | 10.569574 |
| 36 | CE 18:1 | 24.703 | 668.70 > 369.40 | 838524 | 1.0930558 |
| 37 | PC(44:12) | 18.543 | 878.55 > 184.10 | 26139 | 0.0340734 |
| 38 | PC(32:2) | 13.597 | 730.55 > 184.10 | 130252 | 0.1697897 |
| 39 | PC(30:1) | 14.169 | 704.50 > 184.10 | 2931718 | 3.8216335 |
| 40 | LPC(20:3) | 7.789 | 546.35 > 184.10 | 109247 | 0.1424086 |
| 41 | LPC(16:0) | 7.86 | 496.35 > 184.10 | 7623053 | 9.9370112 |
| 42 | PC(40:7) | 14.321 | 832.60 > 184.10 | 40881 | 0.0532903 |
| 43 | PC(38:3) | 15.888 | 812.60 > 184.10 | 1266701 | 1.6512048 |
| 44 | LPC(18:1) | 8.144 | 522.35 > 184.10 | 974586 | 1.2704191 |
| 45 | PC(40:6) | 15.133 | 834.60 > 184.10 | 477220 | 0.6220789 |
| 46 | CE 14:0 | 23.361 | 614.70 > 369.40 | 2148 | 0.0028 |

TABLE 3

Table A (Sequel): Measurement Conditions and Measurement Results for Mass Spectrometry of Each Compound (March 2017)

| ID | Compound Name | Retention Time | Transition | Peak Intensity | Normalized Intensity |
|---|---|---|---|---|---|
| 47 | PC(36:1) | 16.451 | 788.60 > 184.10 | 1242120 | 1.6191623 |
| 48 | PC(28:1) | 13.161 | 676.50 > 184.10 | 143946 | 0.1876404 |
| 49 | LPC(20:4) | 7.376 | 544.35 > 184.10 | 274879 | 0.3583178 |
| 50 | PE(34:1) | 15.533 | 718.55 > 577.50 | 119517 | 0.1557961 |
| 51 | PC(32:0) | 15.188 | 734.55 > 184.10 | 940866 | 1.2264635 |
| 52 | CE 16:1 | 23.455 | 640.70 > 369.40 | 88918 | 0.1159088 |
| 53 | PC(38:2) | 17.496 | 814.65 > 184.10 | 387757 | 0.5054596 |
| 54 | PC(40:4) | 16.197 | 838.65 > 184.10 | 119271 | 0.1554754 |
| 55 | LPC(22:6) | 7.254 | 568.35 > 184.10 | 35039 | 0.045675 |
| 56 | PE(36:1) | 16.52 | 746.55 > 605.55 | 38270 | 0.0498868 |
| 57 | CE 16:0 | 24.567 | 642.70 > 369.40 | 99597 | 0.1298294 |
| 58 | LPE(18:1) | 8.275 | 480.30 > 339.30 | 2586 | 0.003371 |
| 59 | LPC(18:0) | 8.961 | 524.35 > 184.10 | 2451005 | 3.1950013 |
| 60 | LPE(22:6) | 7.234 | 526.30 > 385.25 | 535 | 0.0006974 |
| 61 | PC(30:0) | 14.576 | 706.55 > 184.10 | 89142 | 0.1162008 |
| 62 | PC(38:1) | 18.699 | 816.65 > 184.10 | 216375 | 0.2820551 |
| 63 | PC(30:2) | 13.311 | 702.50 > 184.10 | 218398 | 0.2846922 |
| 64 | LPE(20:4) | 7.35 | 502.30 > 361.25 | 1023 | 0.0013335 |
| 65 | LPE(16:0) | 7.984 | 454.30 > 313.25 | 2468 | 0.0032172 |
| 66 | Chol_sulfate | 9.466 | 465.30 > 97.00 | 3433 | 0.0044751 |
| 67 | CE18:2—OH | 20.149 | 682.80 > 369.40 | 2289 | 0.0029838 |
| 68 | CE18:2—OOH | 18.32 | 698.80 > 369.40 | 3674 | 0.0047892 |
| 69 | CE18:3—OOH | 18.076 | 696.80 > 369.40 | 2433 | 0.0031715 |

TABLE 4

Table B: Measurement Conditions and Measurement Results for Mass Spectrometry of Each Compound (March 2018)

| ID | Compound Name | Retention Time | Transition | Peak Intensity | Normalized Intensity | Rate of increase |
|---|---|---|---|---|---|---|
| 1 | PS (40:6) | 12.848 | 836.55 > 651.50 | 65582 | 0.04537255 | 0.25 |
| 2 | CE 18:3 | 21.329 | 664.70 > 369.40 | 314177 | 0.21736163 | 0.34 |
| 3 | CE 22:5 | 21.613 | 716.70 > 369.40 | 28656 | 0.0198255 | 0.42 |
| 4 | PE (38:6) | 13.72 | 764.50 > 623.50 | 40477 | 0.02800379 | 0.46 |
| 5 | PE (38:5) | 14.175 | 766.55 > 625.50 | 36352 | 0.02514993 | 0.50 |
| 6 | PC (34:4) | 13.074 | 754.55 > 184.10 | 40543 | 0.02804945 | 0.54 |
| 7 | CE 22:4 | 22.53 | 718.70 > 369.40 | 9530 | 0.00659328 | 0.55 |
| 8 | PC (34:2) | 14.202 | 758.55 > 184.10 | 19688927 | 13.6216759 | 0.56 |
| 9 | PC (36:5) | 13.344 | 780.55 > 184.10 | 538931 | 0.37285645 | 0.56 |
| 10 | PC (34:3) | 13.453 | 756.55 > 184.10 | 303770 | 0.2101616 | 0.58 |
| 11 | CE 20:4 | 21.631 | 690.70 > 369.40 | 4348977 | 3.00881583 | 0.61 |
| 12 | CE 18:2 | 22.172 | 666.70 > 369.40 | 13770738 | 9.52720938 | 0.61 |
| 13 | LPC (18:2) | 7.205 | 520.35 > 184.10 | 1347125 | 0.93200103 | 0.63 |
| 14 | PE (36:4) | 14.01 | 740.50 > 599.50 | 151585 | 0.10487325 | 0.64 |
| 15 | CE 22:6 | 21.013 | 714.70 > 369.40 | 644435 | 0.44584881 | 0.69 |
| 16 | PC (38:6) | 13.739 | 806.55 > 184.10 | 2308546 | 1.59715486 | 0.70 |
| 17 | PS (40:5) | 12.968 | 838.55 > 653.55 | 13992 | 0.00968029 | 0.72 |
| 18 | PE (36:3) | 14.275 | 742.55 > 601.50 | 71972 | 0.04979343 | 0.73 |
| 19 | LPE (18:2) | 7.286 | 478.30 > 337.25 | 3373 | 0.00233359 | 0.75 |
| 20 | PC (36:4) | 14.046 | 782.55 > 184.10 | 11723880 | 8.11110192 | 0.76 |
| 21 | Chol | 14.22 | 369.30 > 161.10 | 57788 | 0.03998031 | 0.76 |
| 22 | PS (38:5) | 12.332 | 810.55 > 625.50 | 2582 | 0.00178634 | 0.76 |
| 23 | CE 20:5 | — | 688.70 > 369.40 | 424282 | 0.29353717 | 0.85 |

TABLE 5

Table B (Sequel): Measurement Conditions and Measurement Results for Mass Spectrometry of Each Compound (March 2018)

| ID | Compound Name | Retention Time | Transition | Peak Intensity | Normalized Intensity | Rate of increase |
|---|---|---|---|---|---|---|
| 24 | PE (36:2) | 15.035 | 744.55 > 603.55 | 149689 | 0.10356151 | 0.87 |
| 25 | PE (38:4) | 14.932 | 768.55 > 627.55 | 193760 | 0.13405179 | 0.91 |
| 26 | PC (38:5) | 14.055 | 808.60 > 184.10 | 735222 | 0.5086593 | 0.91 |
| 27 | PS (38:4) | 12.999 | 812.55 > 627.50 | 107186 | 0.07415604 | 0.92 |
| 28 | PC (32:1) | 13.994 | 732.55 > 184.10 | 1213962 | 0.83987294 | 0.96 |
| 29 | PC (36:3) | 14.468 | 784.60 > 184.10 | 6474696 | 4.47948283 | 1.00 |
| 30 | PC (40:5) | 15.053 | 836.60 > 184.10 | 457559 | 0.31655968 | 1.04 |
| 31 | PE (34:2) | 14.104 | 716.50 > 575.50 | 183670 | 0.12707108 | 1.05 |
| 32 | PC (38:4) | 15.057 | 810.60 > 184.10 | 7141696 | 4.94094312 | 1.08 |
| 33 | LPC (20:5) | 6.585 | 542.30 > 184.10 | 39489 | 0.02732025 | 1.08 |
| 34 | PC (34:1) | 15.018 | 760.60 > 184.10 | 19293380 | 13.3480189 | 1.12 |
| 35 | PC (36:2) | 15.242 | 786.60 > 184.10 | 17323681 | 11.9852935 | 1.13 |
| 36 | CE 18:1 | 23.196 | 668.70 > 369.40 | 1799556 | 1.24501293 | 1.14 |
| 37 | PC (44:12) | 18.281 | 878.55 > 184.10 | 57859 | 0.04002943 | 1.17 |
| 38 | PC (32:2) | 13.891 | 730.55 > 184.10 | 290671 | 0.20109913 | 1.18 |
| 39 | PC (30:1) | 13.709 | 704.50 > 184.10 | 6579180 | 4.55176951 | 1.19 |
| 40 | LPC (20:3) | 7.562 | 546.35 > 184.10 | 250373 | 0.17321918 | 1.22 |
| 41 | LPC (16:0) | 7.636 | 496.35 > 184.10 | 17756555 | 12.284775 | 1.24 |
| 42 | PC (40:7) | 13.9 | 832.60 > 184.10 | 95424 | 0.06601857 | 1.24 |
| 43 | PC (38:3) | 15.514 | 812.60 > 184.10 | 3032217 | 2.09782266 | 1.27 |
| 44 | LPC (18:1) | 7.899 | 522.35 > 184.10 | 2365111 | 1.63628904 | 1.29 |
| 45 | PC (40:6) | 14.72 | 834.60 > 184.10 | 1207776 | 0.83559319 | 1.34 |
| 46 | CE 14:0 | 21.972 | 614.70 > 369.40 | 5590 | 0.00386741 | 1.38 |

TABLE 6

Table B (Sequel): Measurement Conditions and Measurement Results for Mass Spectrometry of Each Compound (March 2018)

| ID | Compound Name | Retention Time | Transition | Peak Intensity | Normalized Intensity | Rate of increase |
|---|---|---|---|---|---|---|
| 47 | PC (36:1) | 16.108 | 788.60 > 184.10 | 3405026 | 2.35574852 | 1.45 |
| 48 | PC (28:1) | 12.716 | 676.50 > 184.10 | 409118 | 0.28304604 | 1.51 |
| 49 | LPC (20:4) | 7.166 | 544.35 > 184.10 | 806152 | 0.55773183 | 1.56 |
| 50 | PE (34:1) | 14.853 | 718.55 > 577.50 | 351046 | 0.24286925 | 1.56 |
| 51 | PC (32:0) | 14.83 | 734.55 > 184.10 | 2829881 | 1.95783761 | 1.60 |
| 52 | CE 16:1 | 22.071 | 640.70 > 369.40 | 271519 | 0.18784893 | 1.62 |
| 53 | PC (38:2) | 17.097 | 814.65 > 184.10 | 1228117 | 0.84966599 | 1.68 |
| 54 | PC (40:4) | 15.816 | 838.65 > 184.10 | 382858 | 0.2648782 | 1.70 |
| 55 | LPC (22:6) | 7.051 | 568.35 > 184.10 | 125960 | 0.08714473 | 1.91 |
| 56 | PE (36:1) | 15.796 | 746.55 > 605.55 | 142109 | 0.09831733 | 1.97 |
| 57 | CE 16:0 | 23.076 | 642.70 > 369.40 | 386182 | 0.26717789 | 2.06 |
| 58 | LPE (18:1) | 7.983 | 480.30 > 339.30 | 10917 | 0.00755287 | 2.24 |
| 59 | LPC (18:0) | 8.681 | 524.35 > 184.10 | 10756394 | 7.44175205 | 2.33 |
| 60 | LPE (22:6) | 7.136 | 526.30 > 385.25 | 2605 | 0.00180225 | 2.58 |
| 61 | PC (30:0) | 13.796 | 706.55 > 184.10 | 438635 | 0.30346721 | 2.61 |
| 62 | PC (38:1) | 18.379 | 816.65 > 184.10 | 1106530 | 0.7655467 | 2.71 |
| 63 | PC (30:2) | 12.854 | 702.50 > 184.10 | 1227277 | 0.84908485 | 2.98 |
| 64 | LPE (20:4) | 7.253 | 502.30 > 361.25 | 7692 | 0.00532167 | 3.99 |
| 65 | LPE (16:0) | 7.717 | 454.30 > 313.25 | 24040 | 0.01663194 | 5.17 |
| 66 | Chol_sulfate | 9.07 | 465.30 > 97.00 | 50791 | 0.03513947 | 7.85 |
| 67 | CE18:2-OH | 19.607 | 682.80 > 369.40 | 271568 | 0.18788283 | 62.97 |
| 68 | CE18:2-OOH | 17.439 | 698.80 > 369.40 | 1256989 | 0.86964093 | 181.58 |
| 69 | CE18:3-OOH | 17.171 | 696.80 > 369.40 | 1347331 | 0.93214355 | 293.91 |

The aforementioned sum of the peak intensities corresponding to the phospholipids including lysophospholipid excluded the intensity of PC(34:2) (ID8) which was saturated.

Figure 5:
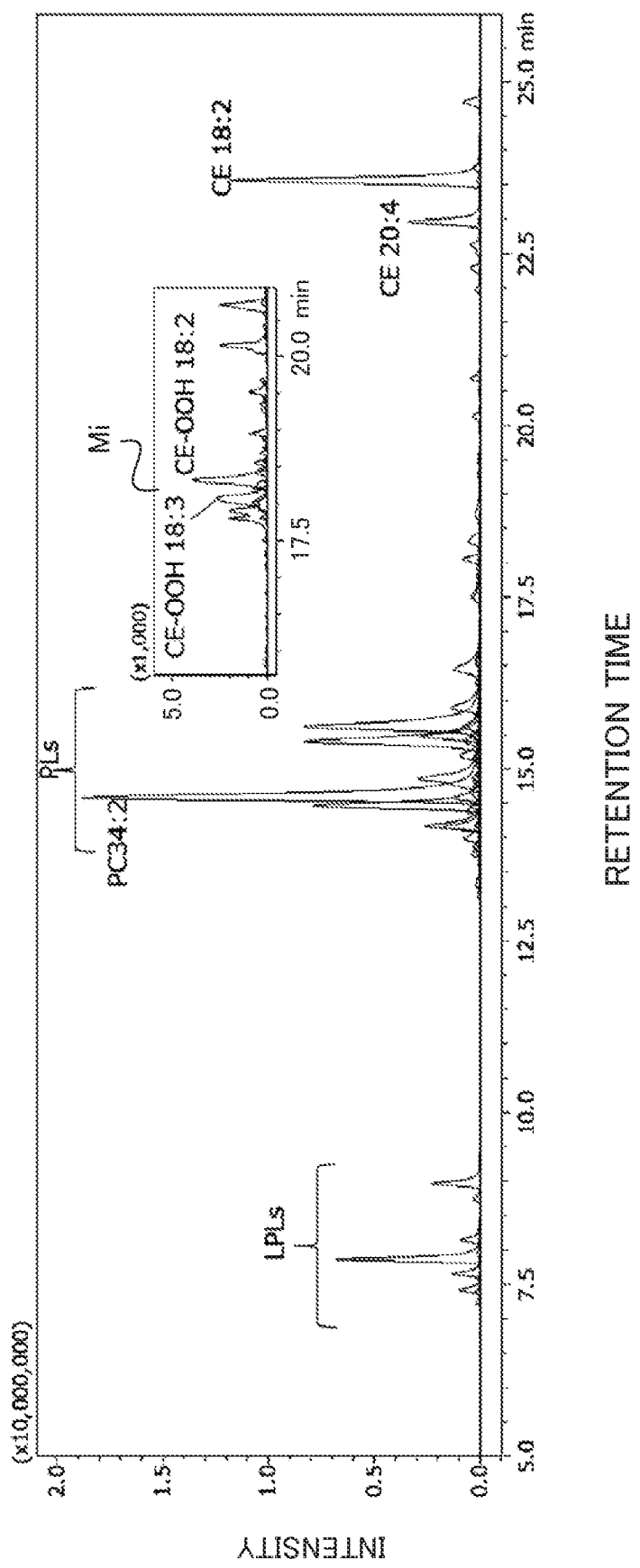
FIG. 5 shows a mass chromatogram obtained by mass spectrometry of a sample in March 2017.
Figure 6:
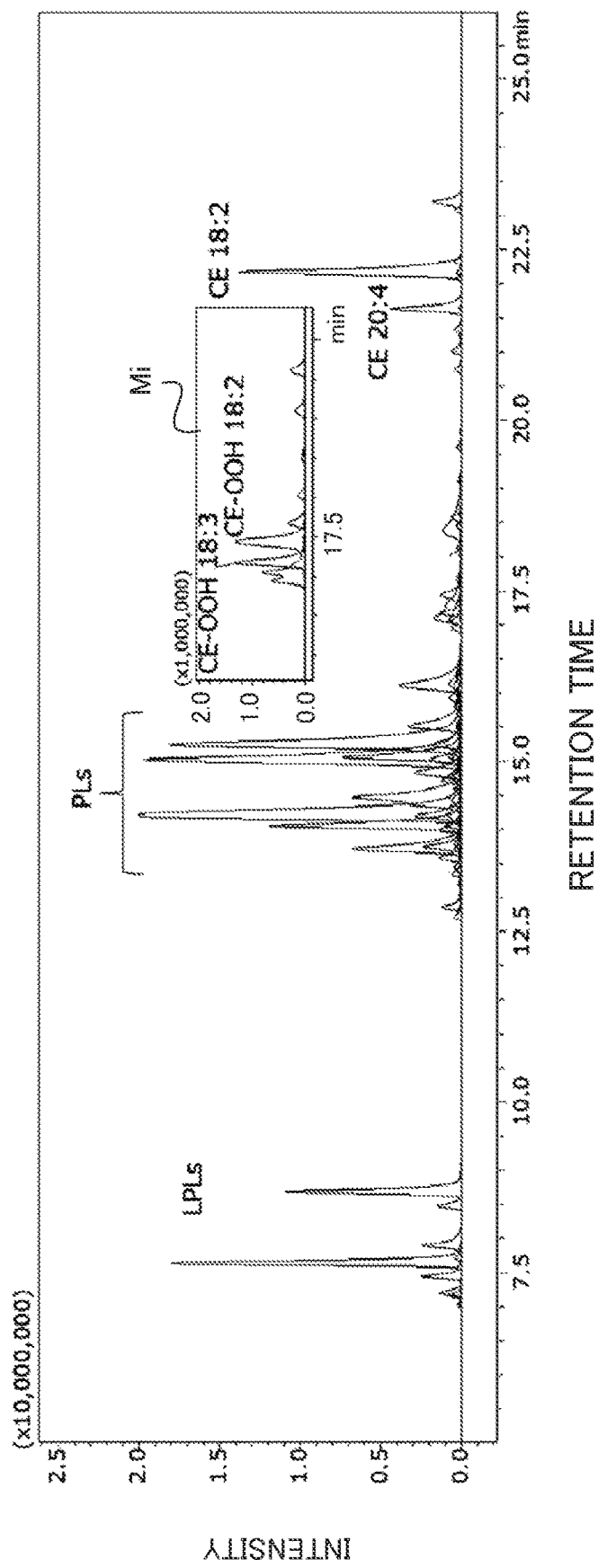
FIG. 6 shows a mass chromatogram obtained by mass spectrometry of a sample in March 2018.

FIGS. 5 and 6 show mass chromatograms obtained by mass spectrometry in March 2017 and March 2018, respectively, on some analyte molecules. In the mass chromatograms of FIGS. 5 and 6, a mass chromatogram Mi is shown which is an enlargement of peaks around a retention time of 17.5 minutes. In these mass chromatograms, peaks corresponding to cholesteryl ester (CE), cholesteryl ester peroxide (CE-OOH), phospholipids (PLs), and lysophospholipids (LPLs) were observed. As shown by ID2, ID12, ID68 and ID69 in Table B, the amount of cholesteryl ester peroxide with respect to the amount of cholesteryl ester in the sample was largely increased by storage for approximately 1 year. As for cholesterol sulfate and cholesteryl ester hydroxide, increase in their amounts by storage for approximately 1 year was also observed (ID66 and ID67).

As shown in Table B, compounds corresponding to ID #23 to 36 were each considered as a compound having less variation even by refrigeration for 1 year or longer, because the percentage of variation in the normalized intensity in the mass spectrometry performed in March 2018 with respect to the normalized intensity in the mass spectrometry performed in March 2017 was 15% or less.

FIGS. 7(A) and 7(B) show enlarged peaks corresponding to (a) cholesteryl ester (18:1) (ID36) and (b) cholesteryl ester (20:5) (ID23) in the mass chromatograms obtained by mass spectrometry in March 2017 and March 2018, respectively.

FIGS. 8(A) and 8(B) show enlarged peaks corresponding to lysophosphatidylcholine (20:5) (ID33) in the mass chromatograms obtained by mass spectrometry in March 2017 and March 2018, respectively.

Figure 9:
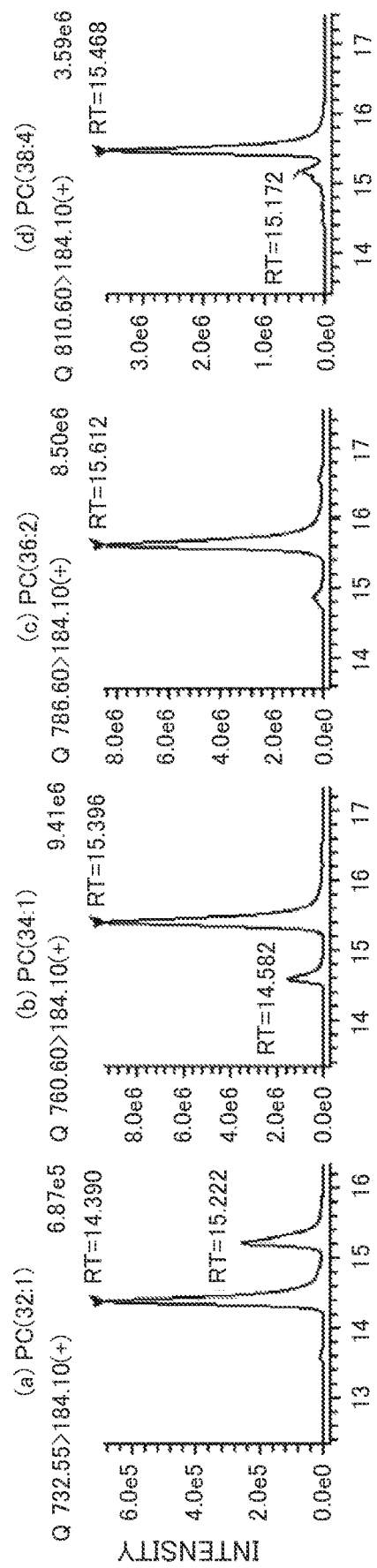
FIG. 9 shows a mass chromatogram showing a peak corresponding to phosphatidylcholine obtained by the mass spectrometry of the sample in March 2017.
Figure 10:
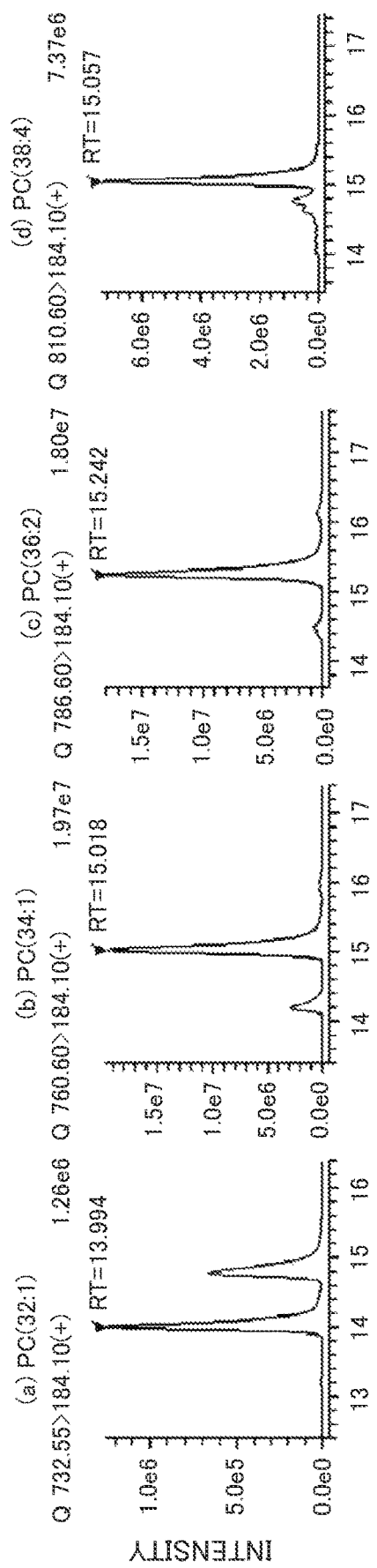
FIG. 10 shows a mass chromatogram showing a peak corresponding to phosphatidylcholine obtained by the mass spectrometry of the sample in March 2018.

FIGS. 9 and 10 show enlarged peaks corresponding to (a) phosphatidylcholine (32:1) (ID28), (b) phosphatidylcholine (34:1) (ID34), (c) phosphatidylcholine (36:2) (ID35) and phosphatidylcholine (38:4) (ID32) in the mass chromatograms obtained by mass spectrometry in March 2017 and March 2018, respectively.

Figure 11:
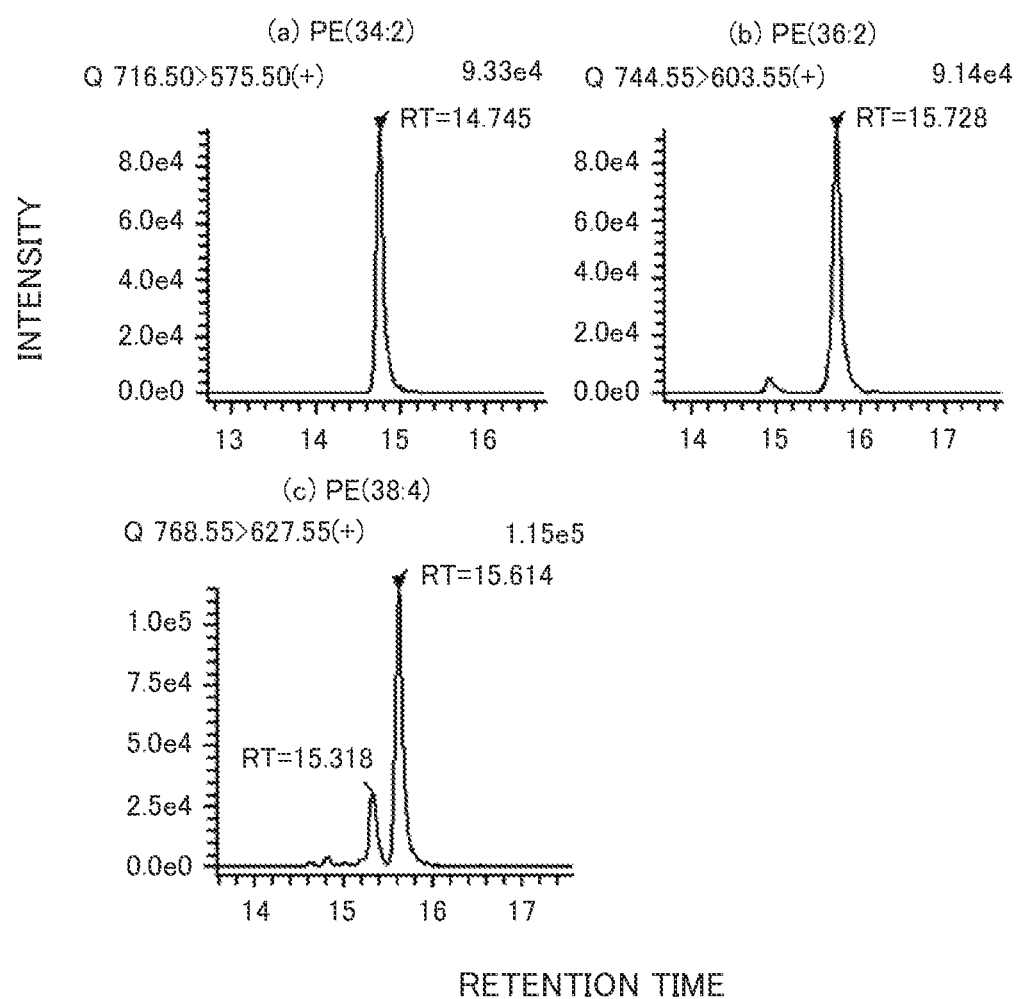
FIG. 11 shows a mass chromatogram showing a peak corresponding to phosphatidylethanolamine obtained by the mass spectrometry of the sample in March 2017.
Figure 12:
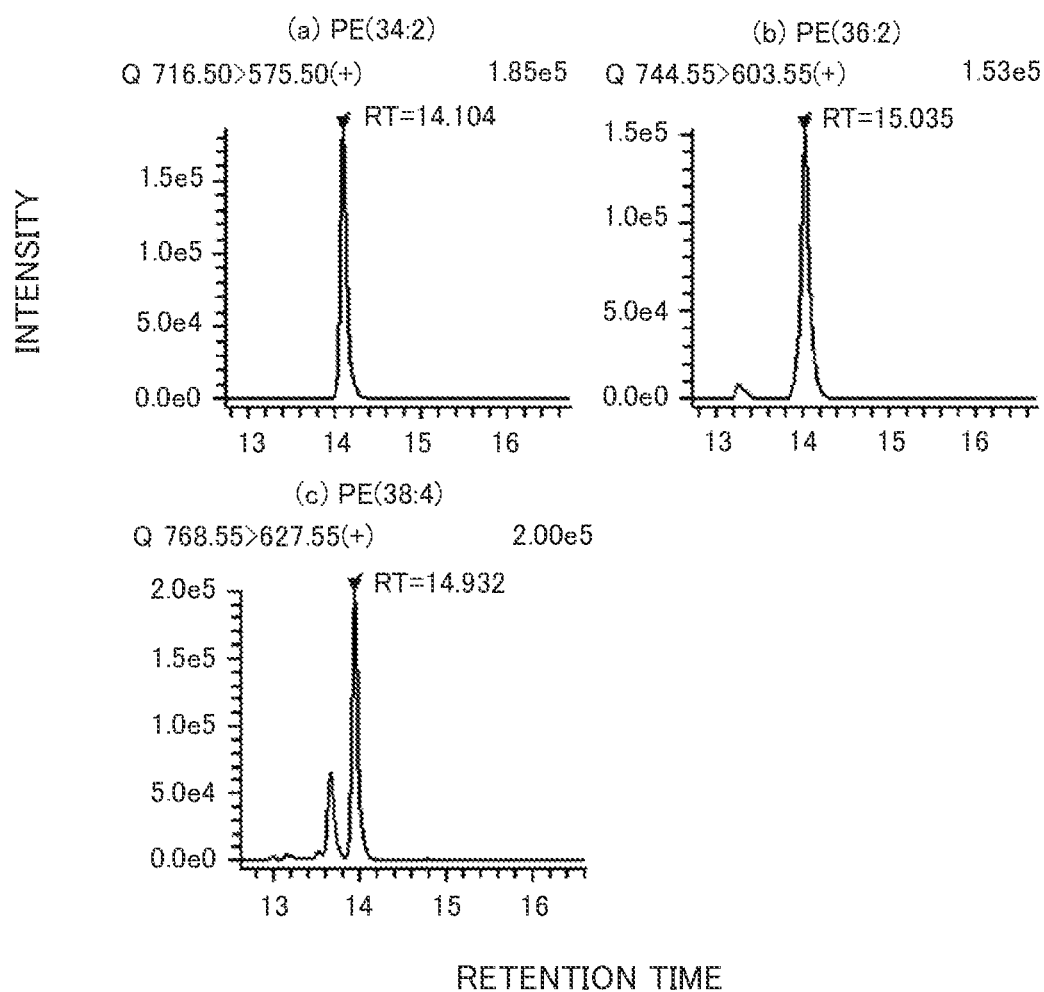
FIG. 12 shows a mass chromatogram showing a peak corresponding to phosphatidylethanolamine obtained by the mass spectrometry of the sample in March 2018.

FIGS. 11 and 12 show enlarged peaks corresponding to (a) phosphatidylethanolamine (34:2) (ID31), (b) phosphatidylethanolamine (36:2) (ID24) and (c) phosphatidylethanolamine (38:4) (ID25) in the mass chromatograms obtained by mass spectrometry in March 2017 and March 2018, respectively.

Mass spectrometry performed in May 2018 LC/MS was performed on the refrigerated sample described above under the following analysis conditions.

Conditions for Liquid Chromatography
System: LCMS-8060 (Shimadzu Corp.)
Analytical column: Kinetex C8 (Phenomenex Inc.) (inside diameter: 2.1 mm, length: 150 mm, particle size: 2.6 μm)
Column temperature: 50° C.
Mobile phase:
  (A) a 20 mM aqueous ammonium formate solution
  (B) a solution of acetonitrile and isopropanol mixed at a volume ratio of 1:1
Flow rate: 0.4 mL/min
Gradient program:

| Time (min) | Concentration (%) of mobile phase B |
|---|---|
| 0 | 25 |
| 0.5 | 25 |
| 1 | 40 |
| 14 | 92.5 |

The concentration of mobile phase B was nonlinearly changed against time from 1 minute through 14 minutes in order to increase difference in elution time among components at elution times of diacylphospholipids.

Conditions for mass spectrometry were the same as those for the aforementioned mass spectrometry performed in March 2017 and March 2018. Transitions were set such that the carbon number and the number of carbon-carbon double bonds in acyl groups were distinguishable for analysis among some compounds having a plurality of acyl groups among compounds of ID23 to ID36 in Table B. In the description below, phosphatidylcholine (PC) and phosphatidylethanolamine (PE) having both of an acyl group having a carbon number x1 and y1 carbon-carbon double bonds and an acyl group having a carbon number of x2 and y2 carbon-carbon double bonds are referred to as PC(x1:y1-x2:y2) and PE(x1:y1-x2:y2), respectively.

Figure 13:
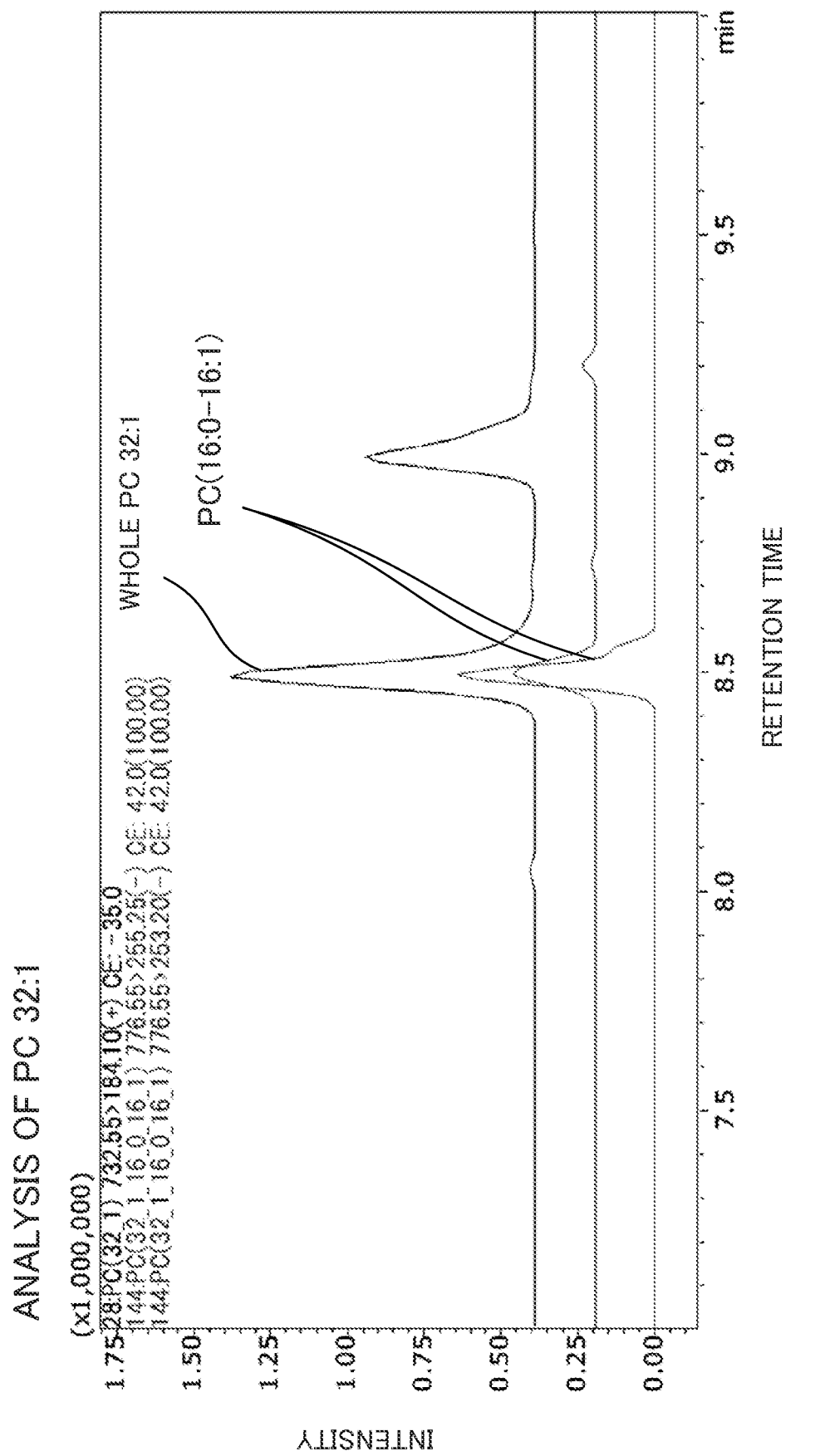
FIG. 13 shows a mass chromatogram of phosphatidylcholine having a plurality of acyl groups with a total carbon number of 32 having a total of 1 carbon-carbon double bond, and mass chromatograms of a plurality of different molecules constituting this phosphatidylcholine.

FIG. 13 is a diagram showing a mass chromatogram corresponding to the whole PC(32:1) and two mass chromatograms from different transitions corresponding to PC(16:0-16:1). The peaks of PC(16:0-16:1) were observed at a retention time corresponding to the peak of the whole PC(32:1).

Figure 14:
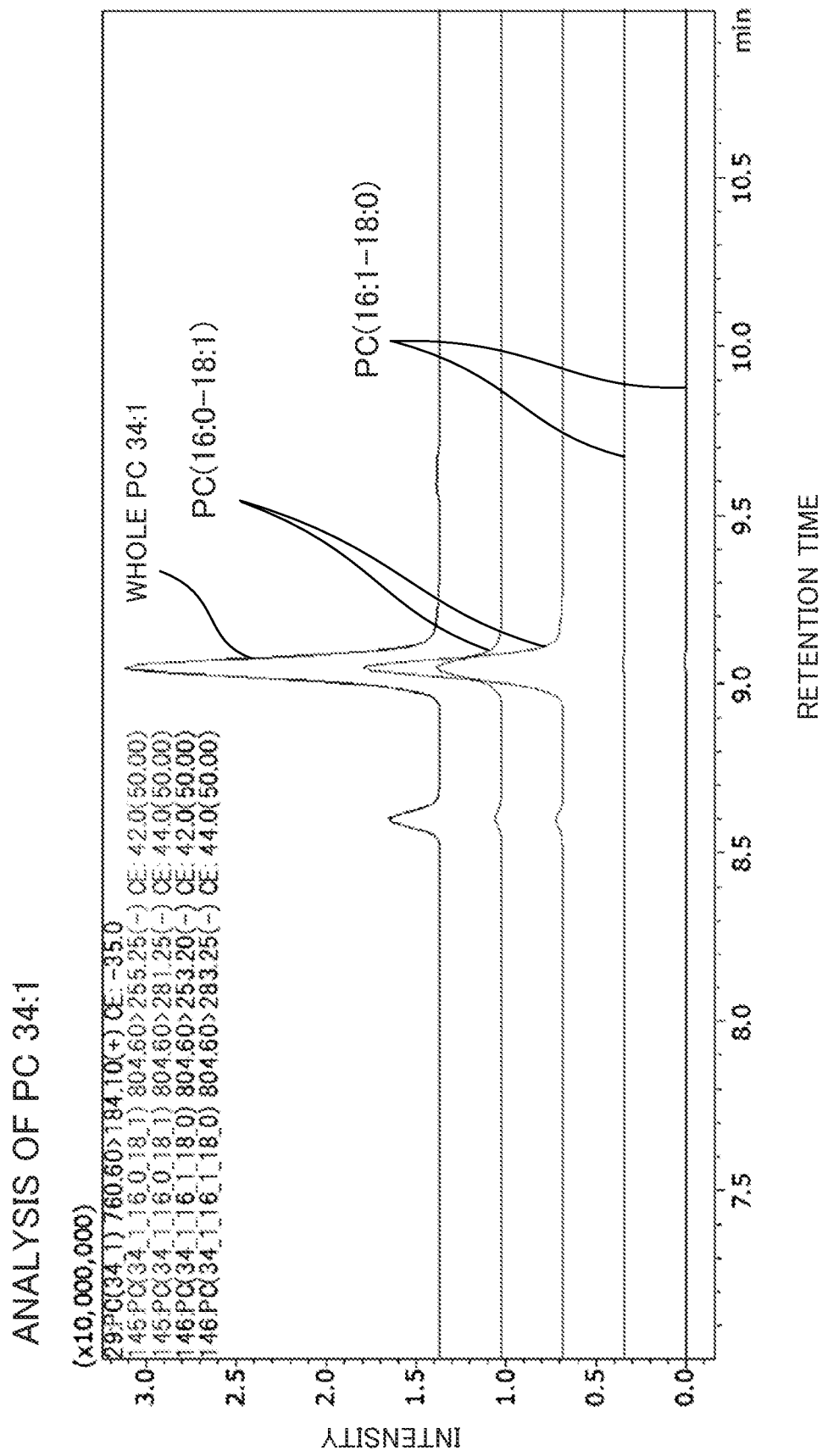
FIG. 14 shows a mass chromatogram of phosphatidylcholine having a plurality of acyl groups with a total carbon number of 34 having a total of 1 carbon-carbon double bond, and mass chromatograms of a plurality of different molecules constituting this phosphatidylcholine.

FIG. 14 is a diagram showing a mass chromatogram corresponding to the whole PC(34:1), two mass chromatograms from different transitions corresponding to PC(16:0-18:1), and two mass chromatograms from different transitions corresponding to PC(16:1-18:0). The peaks of PC(16:0-18:1) were observed at a retention time corresponding to the peak of the whole PC(34:1).

Figure 15:
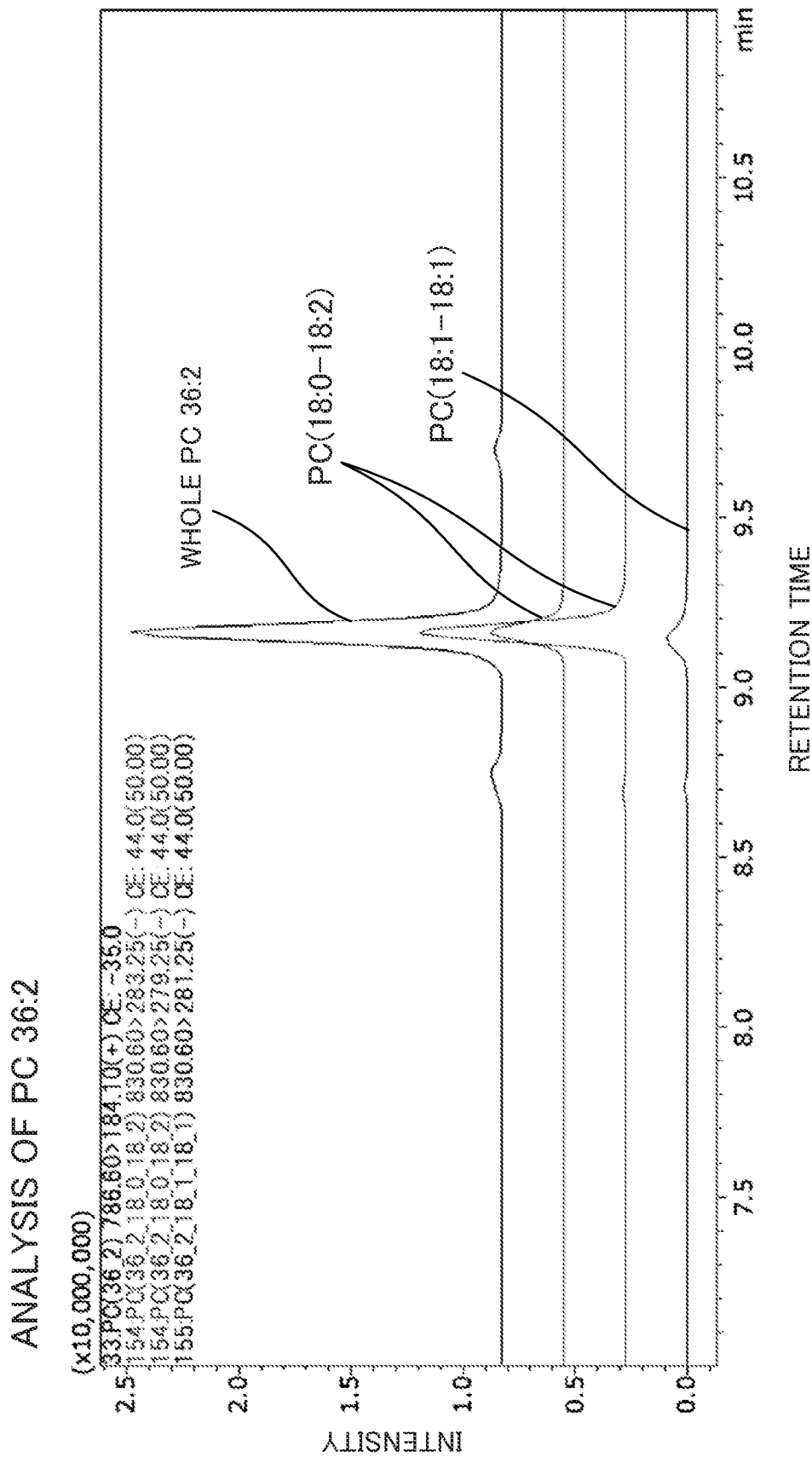
FIG. 15 shows a mass chromatogram of phosphatidylcholine having a plurality of acyl groups with a total carbon number of 36 having a total of 2 carbon-carbon double bonds, and mass chromatograms of a plurality of different molecules constituting this phosphatidylcholine.

FIG. 15 is a diagram showing a mass chromatogram corresponding to the whole PC(36:2), two mass chromatograms from different transitions corresponding to PC(18:0-18:2), and a mass chromatogram corresponding to PC(18:1-18:1). The peaks of PC(18:0-18:2) and PC(18:1-18:1) were observed at a retention time corresponding to the peak of the whole PC(36:2).

Figure 16:
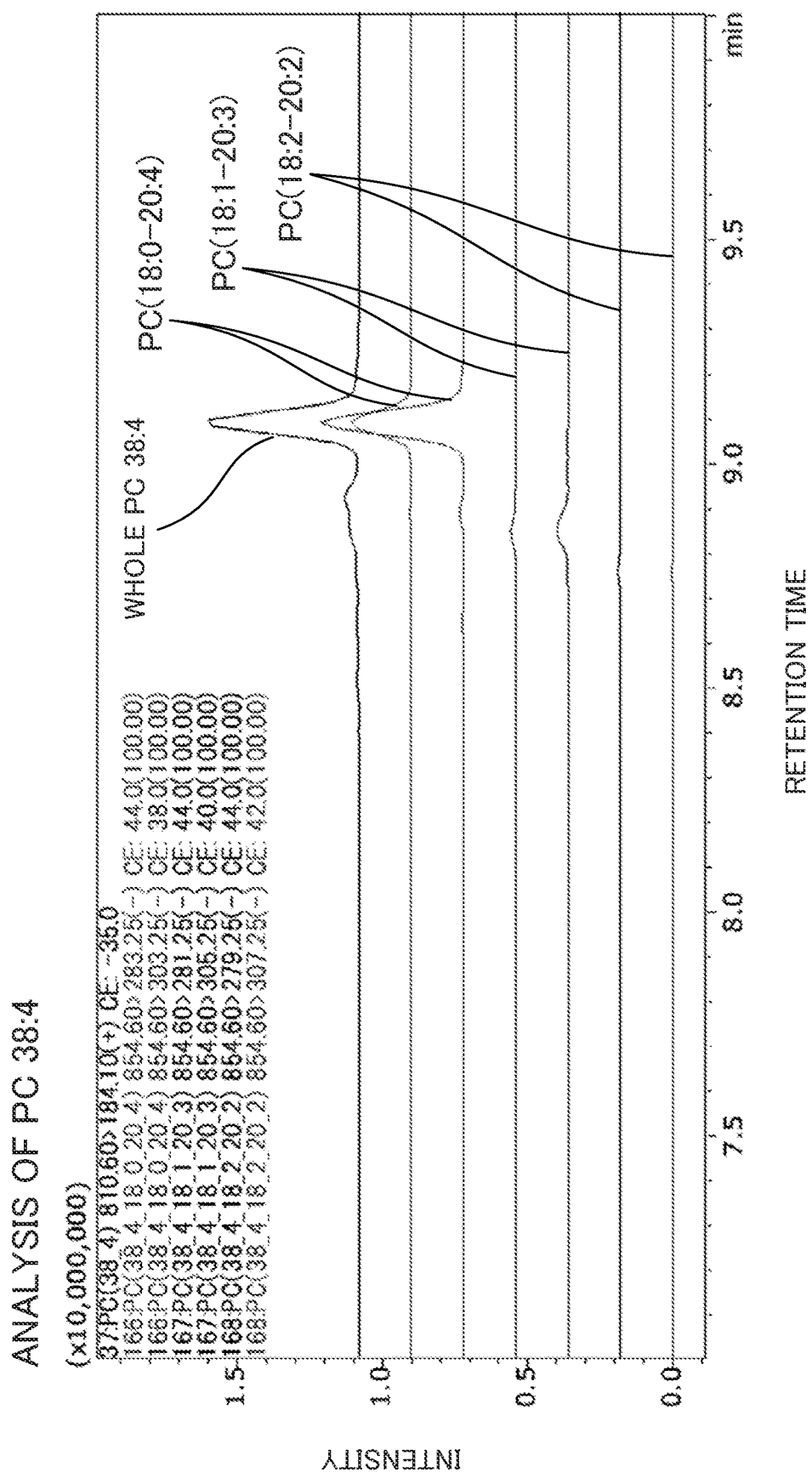
FIG. 16 shows a mass chromatogram of phosphatidylcholine having a plurality of acyl groups with a total carbon number of 38 having a total of 4 carbon-carbon double bonds, and mass chromatograms of a plurality of different molecules constituting this phosphatidylcholine.

FIG. 16 is a diagram showing a mass chromatogram corresponding to the whole PC(38:4), two mass chromatograms from different transitions corresponding to PC(18:0-20:4), two mass chromatograms from different transitions corresponding to PC(18:1-20:3), and two mass chromatograms from different transitions corresponding to PC(18:2-20:2). The peaks of PC(18:0-20:4) were observed at a retention time corresponding to the peak of the whole PC(38:4).

Figure 17:
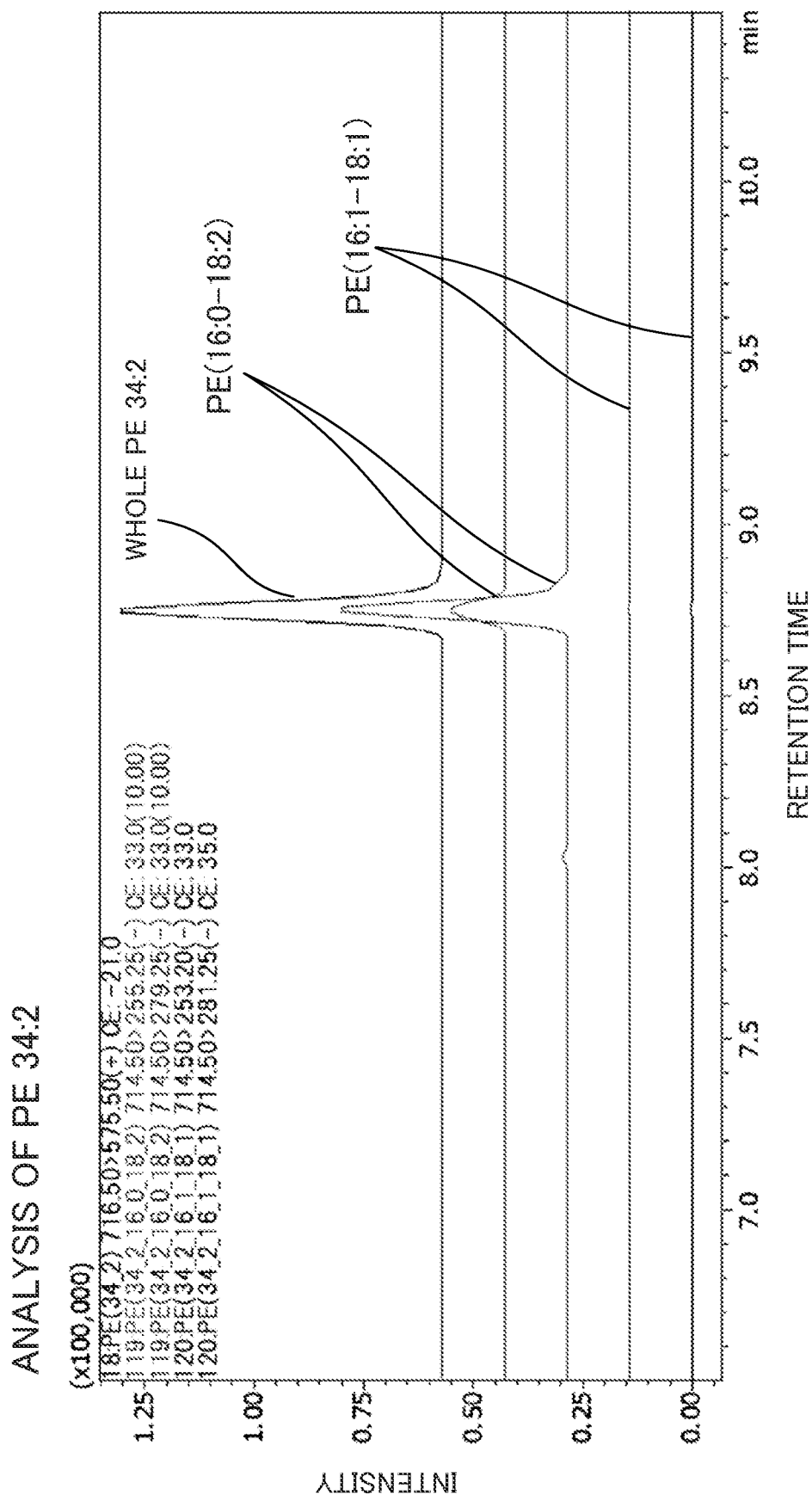
FIG. 17 shows a mass chromatogram of phosphatidylethanolamine having a plurality of acyl groups with a total carbon number of 34 having a total of 2 carbon-carbon double bonds, and mass chromatograms of a plurality of different molecules constituting this phosphatidylethanolamine.

FIG. 17 is a diagram showing a mass chromatogram corresponding to the whole PE(34:2), two mass chromatograms from different transitions corresponding to PE(16:0-18:2), and two mass chromatograms from different transitions corresponding to PE(16:1-18:1). The peaks of PE(16:0-18:2) were observed at a retention time corresponding to the peak of the whole PE(34:2).

Figure 18:
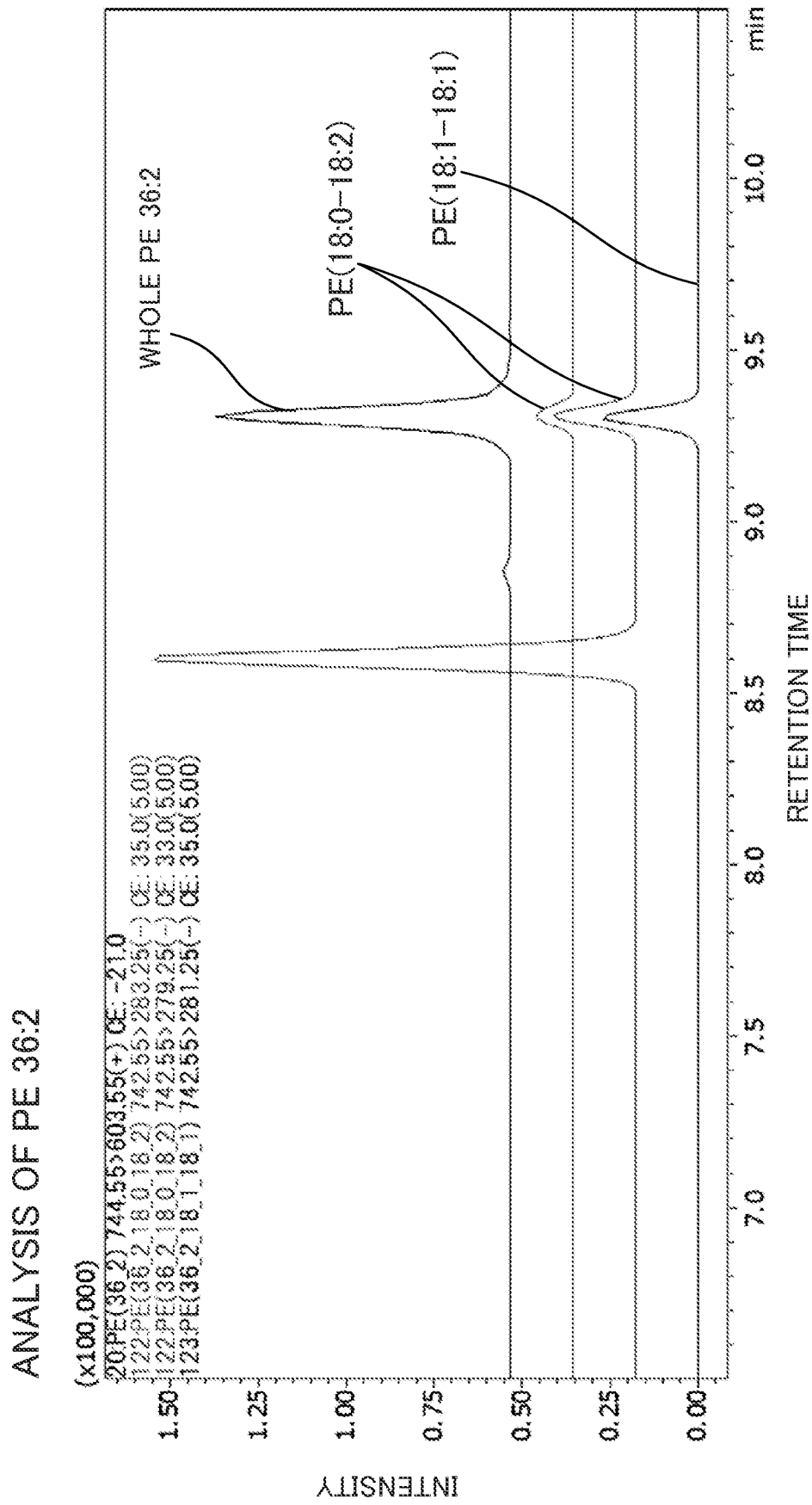
FIG. 18 shows a mass chromatogram of phosphatidylethanolamine having a plurality of acyl groups with a total carbon number of 36 having a total of 2 carbon-carbon double bonds, and mass chromatograms of a plurality of different molecules constituting this phosphatidylethanolamine.

FIG. 18 is a diagram showing a mass chromatogram corresponding to the whole PE(36:2), two mass chromatograms from different transitions corresponding to PE(18:0-18:2), and a mass chromatogram corresponding to PE(18:1-18:1). The peaks of PE(18:0-18:2) and PE(18:1-18:1) were observed at a retention time corresponding to the peak of the whole PE(36:2).

Figure 19:
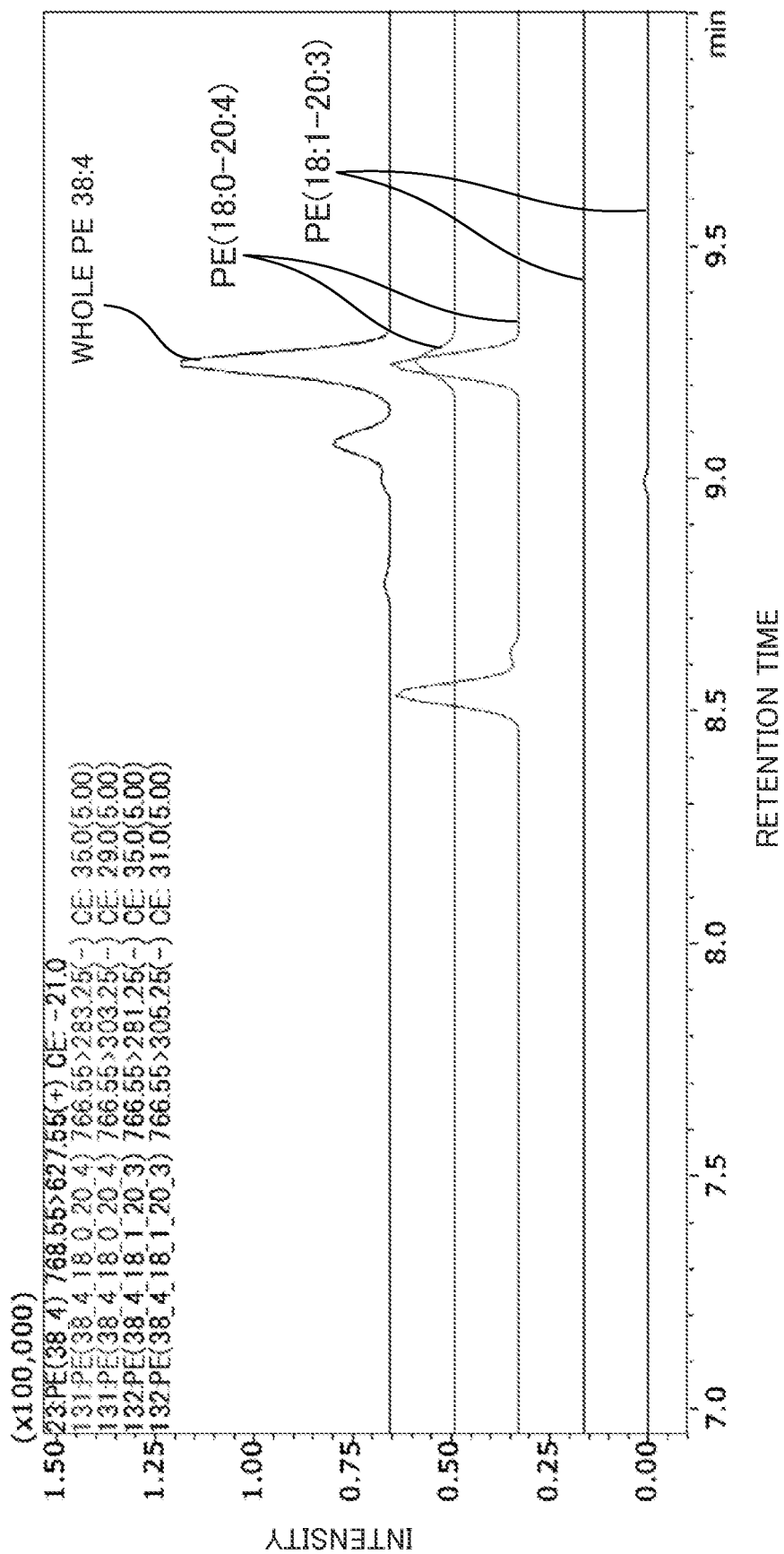
FIG. 19 shows a mass chromatogram of phosphatidylethanolamine having a plurality of acyl groups with a total carbon number of 38 having a total of 4 carbon-carbon double bonds, and mass chromatograms of a plurality of different molecules constituting this phosphatidylethanolamine.

FIG. 19 is a diagram showing a mass chromatogram corresponding to the whole PE(38:4), two mass chromatograms from different transitions corresponding to PE(18:0-20:4), and two mass chromatograms from different transitions corresponding to PE(18:1-20:3). The peaks of PE(18:0-20:4) were observed at a retention time corresponding to the peak of the whole PE(38:4).

The disclosure of the following priority application is herein incorporated by reference: Japanese Patent Application No. 2018-109023 (filed on Jun. 6, 2018).

REFERENCE SIGNS LIST

1 . . . Analytical device, 10 . . . Liquid chromatograph, 14 . . . Analytical column, . . . Mass spectrometer, 21 . . . Ionization chamber, 23 . . . First mass separation part, 24 . . . Collision cell, 25 . . . Second mass separation part, 30 . . . Detection part, 40 . . . Information processing part, 43 . . . Memory part, 44 . . . Output part, 50 . . . Control part, 52 . . . Analysis part, 100 . . . Measurement part, 521 . . . Chromatogram preparation part, 522 . . . Degree-of-oxidation analysis part, 523 . . . Normalization part, S . . . Sample, Si . . . Sample-derived ion.

The invention claimed is:

1. An analysis method, comprising:
   subjecting a sample to liquid chromatography;
   performing first mass spectrometry of the sample subjected to the liquid chromatography to detect a first ion corresponding to cholesteryl ester and a second ion corresponding to cholesteryl ester peroxide; and
   analyzing a degree of oxidation of the sample based on a ratio between an intensity of the detected first ion and an intensity of the detected second ion.

2. The analysis method according to claim 1, further comprising
   calculating an index that indicates the degree of oxidation of the sample based on a ratio obtained by dividing any one of the intensity of the first ion and the intensity of the second ion by the other.

3. The analysis method according to claim 2, further comprising
   outputting the index, or information that indicates the degree of oxidation of the sample based on the index.

4. The analysis method according to claim 2, further comprising
   analyzing measurement data obtained by the first mass spectrometry based on the index.

5. The analysis method according to claim 1, further comprising:
   detecting respective sample-derived ions corresponding to components of the sample by the first mass spectrometry;
   calculating a sum of intensities of ions corresponding to phospholipids among the sample-derived ions; and
   normalizing an intensity of each of the detected sample-derived ions using the sum.

6. The analysis method according to claim 5, wherein
   the phospholipids include lysophospholipid, and phospholipid having a plurality of acyl groups.

7. The analysis method according to claim 5, further comprising,
   when the first mass spectrometry is performed at least twice at a predetermined interval of time on the same sample, detecting a non-variation ion whose variation in the normalized intensity is equal to or less than a predetermined percentage by second mass spectrometry, and normalizing an intensity of each ion detected by the second mass spectrometry using the intensity of the non-variation ion.

8. The analysis method according to claim 1, further comprising
   normalizing intensities of respective sample-derived ions corresponding to components of the sample detected in the first mass spectrometry using an intensity of an ion corresponding to a predetermined substance, wherein
   the substance is
   at least one molecule selected from the group consisting of cholesteryl ester having an acyl group having a carbon number of 18 and 1 carbon-carbon double bond, cholesteryl ester having an acyl group having a carbon number of 20 and 5 carbon-carbon double bonds, lysophosphatidylcholine having an acyl group having a carbon number of 20 and 5 carbon-carbon double bonds, phosphatidylcholine having two acyl groups having a total carbon number of 32 and a total of 1 carbon-carbon double bond, phosphatidylcholine having two acyl groups having a total carbon number of 34 and a total of 1 carbon-carbon double bond, phosphatidylcholine having two acyl groups having a total carbon number of 36 and a total of 2 carbon-carbon double bonds, phosphatidylcholine having two acyl groups having a total carbon number of 38 and a total of 4 carbon-carbon double bonds, phosphatidylethanolamine having two acyl groups having a total carbon number of 34 and a total of 2 carbon-carbon double bonds, phosphatidylethanolamine having two acyl groups having a total carbon number of 36 and a total of 2 carbon-carbon double bonds, and phosphatidylethanolamine having two acyl groups having a total carbon number of 38 and a total of 4 carbon-carbon double bonds.

9. The analysis method according to claim 8, wherein
   an intensity of the sample-derived ion corresponding to each cholesteryl ester in the sample detected in the first mass spectrometry is normalized using a sum of intensities of ions corresponding to cholesteryl esters included in the substance.

10. The analysis method according to claim 8, wherein
    an intensity of the sample-derived ion corresponding to each lysophospholipid in the sample detected in the first mass spectrometry is normalized using an intensity of an ion corresponding to lysophosphatidylcholine included in the substance.

11. The analysis method according to claim 8, wherein
    an intensity of the sample-derived ion corresponding to each phospholipid containing a plurality of acyl groups in the sample detected in the first mass spectrometry is normalized using a sum of intensities of ions corresponding to phosphatidylcholines and phosphatidylethanolamines included in the substance.

12. The analysis method according to claim 1, further comprising:
    detecting respective sample-derived ions corresponding to components of the sample by the first mass spectrometry;
    calculating a sum of intensities of ions corresponding to lysophospholipid and phospholipid having a plurality of acyl groups among the sample-derived ions; and
    normalizing respective intensities of the detected sample-derived ions using the sum, wherein
    the phospholipid excludes a molecule containing an acyl group having a carbon number of 20 and 4 carbon-carbon double bonds.

13. The analysis method according to claim 5, wherein:
    the sample-derived ions include a lipid molecule containing a fatty acid or acyl group having a carbon number of 20 and 4 carbon-carbon double bonds; and
    the analysis method further comprises determining whether or not the sample has been obtained from a healthy individual based on a normalized intensity of an ion corresponding to the lipid molecule.

14. The analysis method according to claim 1, wherein
    the sample is a sample stored in a state of blood.

15. An analytical device, comprising:
    a sample introduction part which introduces a sample;
    a liquid chromatograph which separates the sample;
    a mass spectrometry part which performs first mass spectrometry of the sample separated by the liquid chromatograph to detect a first ion corresponding to cholesteryl ester and a second ion corresponding to cholesteryl ester peroxide; and
    a degree-of-oxidation analysis part which analyzes a degree of oxidation of the sample based on a ratio between an intensity of the detected first ion and an intensity of the detected second ion.

* * * * *